(12) United States Patent
Mei

(10) Patent No.: US 10,504,462 B2
(45) Date of Patent: Dec. 10, 2019

(54) NON-LINEAR PROCESSING OF TWO-DIMENSIONAL DATA

(71) Applicant: QUALCOMM Incorporated, San Diego, CA (US)

(72) Inventor: Chunhui Mei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 15/880,099

(22) Filed: Jan. 25, 2018

(65) Prior Publication Data

US 2019/0228723 A1  Jul. 25, 2019

(51) Int. Cl.
*G09G 3/36* (2006.01)
*G06T 1/60* (2006.01)
*G06F 12/0862* (2016.01)
*G06T 11/00* (2006.01)

(52) U.S. Cl.
CPC ....... *G09G 3/3607* (2013.01); *G06F 12/0862* (2013.01); *G06T 1/60* (2013.01); *G06T 11/001* (2013.01); *G06F 2212/602* (2013.01)

(58) Field of Classification Search
None
See application file for complete search history.

(56) References Cited

U.S. PATENT DOCUMENTS

| | | | | |
|---|---|---|---|---|
| 9,542,719 B2 * | 1/2017 | Courroux | ............. | G06F 17/148 |
| 2010/0325187 A1 | 12/2010 | Juffa et al. | | |
| 2012/0213278 A1 * | 8/2012 | Yasugi | ................. | H04N 19/176 |
| | | | | 375/240.12 |
| 2014/0122812 A1 | 5/2014 | Hakura et al. | | |
| 2015/0317763 A1 | 11/2015 | Mather et al. | | |
| 2017/0053375 A1 | 2/2017 | Bolz | | |
| 2018/0028837 A1 * | 2/2018 | Schaetti | ................. | A61N 5/103 |
| 2018/0189640 A1 * | 7/2018 | Henry | .................... | G06N 3/063 |
| 2018/0255307 A1 * | 9/2018 | Douady-Pleven | ........ | G06T 3/00 |
| 2019/0114499 A1 * | 4/2019 | Delaye | ................. | G06F 17/153 |

FOREIGN PATENT DOCUMENTS

WO    2016000129 A1    1/2016

* cited by examiner

*Primary Examiner* — YuJang Tswei
(74) *Attorney, Agent, or Firm* — Shumaker & Sieffert, P.A.

(57) ABSTRACT

A device for graphics processing includes a memory and at least one processor. The at least one processor is configured to generate image data for an image, fetch, for each two-dimensional matrix of multiple two-dimensional matrices of units of the image, a respective portion of the image data, and process each two-dimensional matrix of the multiple two-dimensional matrices based on the respective portion of the image data to generate pixel data for the image. To process each two-dimensional matrix of the multiple two-dimensional matrices, the at least one processor is configured to process multiple units arranged in a first two-dimensional matrix of the multiple two-dimensional matrices and process, after processing the multiple units arranged in the first two-dimensional matrix, multiple units arranged in a second two-dimensional matrix of the multiple two-dimensional matrices.

25 Claims, 14 Drawing Sheets

NON-LINEAR PROCESSING OF TWO-DIMENSIONAL DATA

TECHNICAL FIELD

This disclosure relates to techniques for processing including, for example, graphics processing.

BACKGROUND

Two-dimensional data including, for instance, visual content for display, such as content for graphical user interfaces and video games, may be generated by a graphics processing unit (GPU) of a display host. A GPU may convert two-dimensional (2D) or three-dimensional (3D) objects into a two-dimensional pixel representation that may be displayed. The display host outputs the two-dimensional pixel representation to a display client for output at a display (e.g., a liquid-crystal display (LCD) panel).

SUMMARY

In general, the techniques of this disclosure relate to reducing overfetch (e.g., when particular data is fetched two or more times because of cache thrashing) when processing two-dimensional data. Examples of two-dimensional data may include, for example: red, green, blue (RGB) data; red, green, blue, alpha (RGBA) data; chroma data; luma data; alpha data; or other two-dimensional data. The two-dimensional data may be stored in a memory (e.g., a system memory) and may be converted into pixel data that can be displayed on a screen. For example, rather than linearly rasterizing units to generate pixel data for an image, a graphics processing unit may non-linearly rasterize or process two-dimensional data using spatial locality techniques. An example spatial locality technique may include recursive tiling.

In an example of the disclosure, a method for graphics processing includes generating, by a processor, image data for an image, fetching, by the processor, for each two-dimensional matrix of multiple two-dimensional matrices of units of the image, a respective portion of the image data, and processing, by the processor, each two-dimensional matrix of the multiple two-dimensional matrices based on the respective portion of the image data to generate pixel data for the image. Processing each two-dimensional matrix of the multiple two-dimensional matrices includes processing multiple units arranged in a first two-dimensional matrix of the multiple two-dimensional matrices. The first two-dimensional matrix includes multiple units arranged in a first row of the image and multiple arranged in a second row of the image that is adjacent to the first row of the image. Processing each two-dimensional matrix of the multiple two-dimensional matrices further includes processing, after processing the multiple units arranged in the first two-dimensional matrix, multiple units arranged in a second two-dimensional matrix of the multiple two-dimensional matrices. The second two-dimensional matrix includes one or more units arranged in the first row of the image and one or more units arranged in the second row of the image.

Another example in accordance with the techniques of this disclosure describes a device for graphics processing that includes a memory and at least one processor. The at least one processor is configured to generate image data for an image, fetch, for each two-dimensional matrix of multiple two-dimensional matrices of units of the image, a respective portion of the image data, and process each two-dimensional matrix of the multiple two-dimensional matrices based on the respective portion of the image data to generate pixel data for the image. To process each two-dimensional matrix of the multiple two-dimensional matrices, the at least one processor is configured to process multiple units arranged in a first two-dimensional matrix of the multiple two-dimensional matrices. The first two-dimensional matrix includes multiple units arranged in a first row of the image and multiple units arranged in a second row of the image that is adjacent to the first row of the image. To process each two-dimensional matrix of the multiple two-dimensional matrices, the at least one processor is further configured to process, after processing the multiple units arranged in the first two-dimensional matrix, multiple units arranged in a second two-dimensional matrix of the multiple two-dimensional matrices. The second two-dimensional matrix includes one or more units arranged in the first row of the image and one or more units arranged in the second row of the image.

Another example in accordance with the techniques of this disclosure describes a device for graphics processing. The device may include means for generating image data for an image, means for fetching, for each two-dimensional matrix of multiple two-dimensional matrices of units of the image, a respective portion of the image data, and means for processing each two-dimensional matrix of the multiple two-dimensional matrices based on the respective portion of the image data to generate pixel data for the image. The means for processing each two-dimensional matrix of the multiple two-dimensional matrices includes means for processing multiple units arranged in a first two-dimensional matrix of the multiple two-dimensional matrices. The first two-dimensional matrix includes multiple units arranged in a first row of the image and multiple units arranged in a second row of the image that is adjacent to the first row of the image. The means for processing each two-dimensional matrix of the multiple two-dimensional matrices includes means for processing, after processing the multiple units arranged in the first two-dimensional matrix, multiple units arranged in a second two-dimensional matrix of the multiple two-dimensional matrices. The second two-dimensional matrix includes one or more units arranged in the first row of the image and one or more units arranged in the second row of the image.

Another example in accordance with the techniques of this disclosure describes a non-transitory computer-readable storage medium that includes instructions stored thereon. The instructions, when executed, may cause at least one processor to generate image data for an image, fetch, for each two-dimensional matrix of multiple two-dimensional matrices of units of the image, a respective portion of the image data, and process each two-dimensional matrix of the multiple two-dimensional matrices based on the respective portion of the image data to generate pixel data for the image. To process each two-dimensional matrix of the multiple two-dimensional matrices, the instructions further cause the at least one processor to process multiple units arranged in a first two-dimensional matrix of the multiple two-dimensional matrices. The first two-dimensional matrix includes multiple units arranged in a first row of the image and multiple units arranged in a second row of the image that is adjacent to the first row of the image. To process each two-dimensional matrix of the multiple two-dimensional matrices, the instructions further cause the at least one processor to process, after processing the multiple units arranged in the first two-dimensional matrix, multiple units arranged in a second two-dimensional matrix of the multiple two-dimensional matrices. The second two-dimensional matrix includes one or more units arranged in the first row of the image and one or more units arranged in the second row of the image.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is an illustration of recursively processing a square group of units in accordance with the techniques of this disclosure.

FIG. 8 is an illustration of recursively processing an oblong group of units in accordance with the techniques of this disclosure.

DETAILED DESCRIPTION

Figure 1:
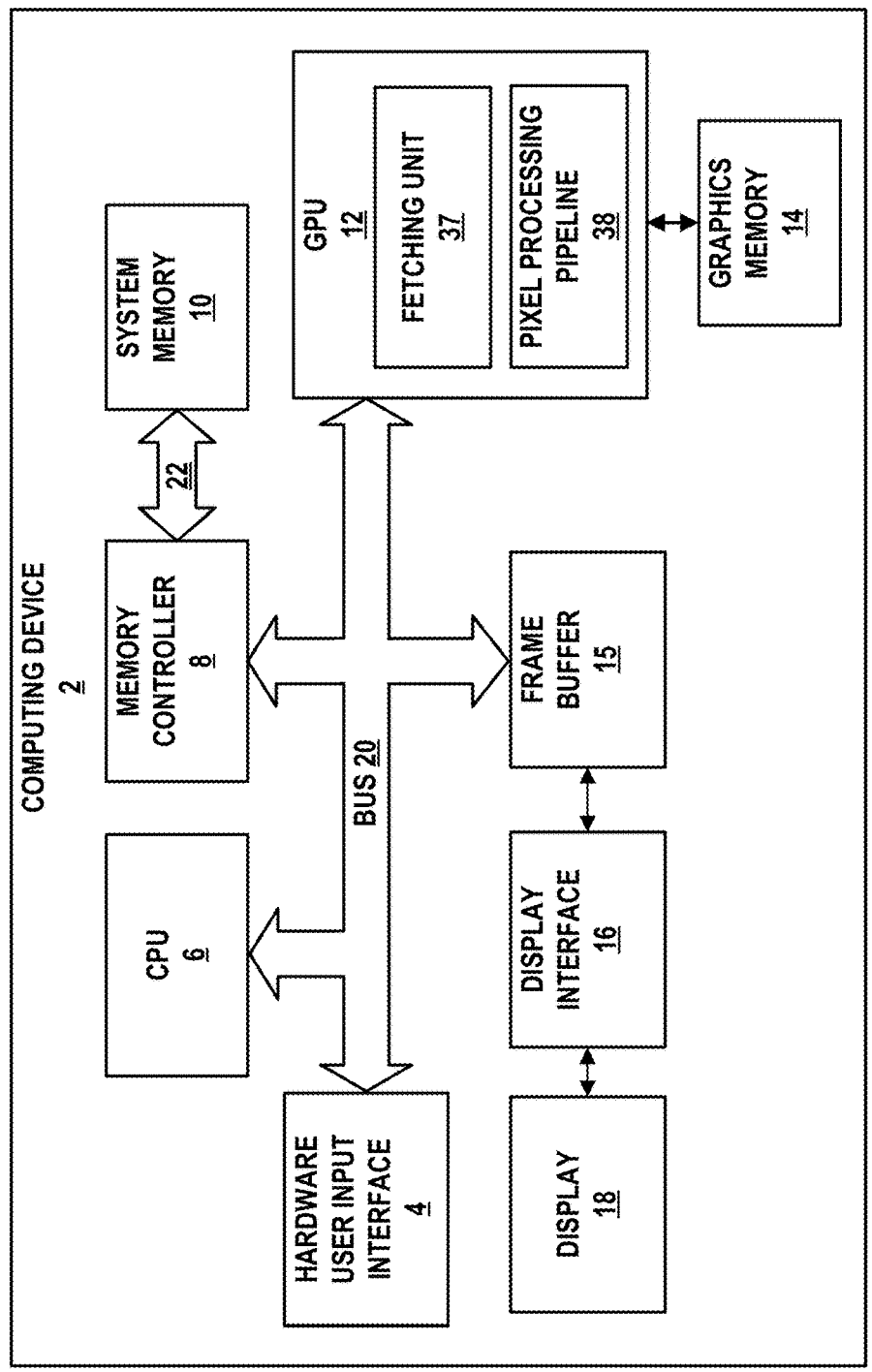
FIG. 1 is a block diagram illustrating an example computing device that may be used to non-linearly process two-dimensional data in accordance with the techniques of this disclosure.

In general, the techniques of this disclosure relate to reducing overfetch when processing two-dimensional data (e.g., post-processing of image data). Examples of two-dimensional data may include data stored in a system memory (e.g., red, green, blue (RGB) data; red, green, blue, alpha (RGBA) data; chroma data; luma data; alpha data; or other two-dimensional data). As used herein, overfetch may refer to instances where particular data is fetched two or more times because of cache thrashing (e.g., deleting stored data to allow storage of different data). For instance, an overfetch ratio may be equal to a number of overfetches (e.g., a fetch for data previously fetched) divided by a number of total number of fetch requests.

A processor, such as, but not limited to, for example, a graphics processing unit (GPU) may rasterize portions of an image to generate pixel data for the portion of an image. The processor may divide each image into "units" or "working groups." To perform some rasterizing operations on a particular unit, the processor may fetch image data for pixels outside of the particular unit. In some examples, rasterizing may include postprocessing operations to improve pixel data for a particular pixel prior to output at a display, which may fetch image data for pixels outside of the particular pixel. Examples of postprocessing operations may include motion blur, depth of field, and Gaussian blur. Motion blur may blur adjacent pixel values based on a motion of an object. Depth of field may blur pixels for objects based on a depth of an object. Gaussian blur may blur pixels to reduce image noise and reduce detail.

In some systems, the processor may "linearly" rasterize or process two-dimensional data to perform processing operations. As used herein, linearly rasterizing may include instances where a processor rasterizes all units arranged in a particular row of an image for an image before rasterizing units arranged in another row of the image. Said differently, a processor configured for linearly rasterizing may utilize sequential locality techniques, where two-dimensional data is processed sequentially (e.g., line-by-line). However, for some processing operations, a processor configured for linearly processing two-dimensional data may result in significant overfetching. For example, a processor performing vertical and horizontal Gaussian blur may have a combined overfetch ratio of 33%.

As previously discussed, overfetch may represent a number of times data is fetched from memory. For example, some systems may fetch particular data to perform a first postprocessing operation, thrash (e.g., delete) the particular data to perform a second postprocessing operation because the cache is full and/or cache size is limited, and fetch the particular data again to perform a third postprocessing operation. Systems that have a relatively high overfetch ratio may consume more processing resources, use more bandwidth, and consume more power compared to systems that have a relatively low overfetch ratio.

In accordance with one or more techniques described herein, rather than linearly rasterizing or processing two-dimensional data using sequential locality techniques, a processor may non-linearly rasterize or process two-dimensional data using spatial locality techniques to reduce overfetch. An example spatial locality technique may include recursive tiling, as will be described in more detail below. Configuring a processor for non-linearly rasterizing or processing of two-dimensional data may help to reduce overfetch compared to systems that linearly rasterizing or process two-dimensional data.

Reducing overfetch may improve an operation of a computing device configured to process two-dimensional data. For example, one or more techniques described herein, may help to increase a number of times a computing device processes two-dimensional data using data already cached to help to reduce a number of times data is fetched. That is, for example, rather than fetching particular data to process a first pixel, thrashing the particular data from a cache, and fetching the particular data again to process a second pixel, one or more techniques described herein may help to fetch the particular data once to process both the first and second pixels prior to thrashing the particular data from cache. In some examples, reducing overfetch may result in a reduction of power usage by a computing device. For example, reducing overfetch may reduce bandwidth usage for retrieving data for storage at a cache, which may reduce power usage of the computing device. In some examples, reducing overfetch may reduce processor usage for fetching data, which may reduce power usage of the computing device.

Although the previous example describes a processor as performing one or more techniques of this disclosure, in some examples, a graphics processing unit, a display processor, a central processing unit (CPU), a digital signal processor (DSP), or any other processor may perform one or more techniques of this disclosure for processing two-dimensional data.

FIG. 1 is a block diagram illustrating an example computing device 2 that may be used to non-linearly process two-dimensional data in accordance with the techniques of this disclosure. Computing device 2 may include, for example, a personal computer, a desktop computer, a laptop computer, a tablet computer, a computer workstation, a video game platform or console, a mobile telephone such as, e.g., a cellular or satellite telephone, a landline telephone, a smartphone, a handheld device such as a portable video game device or a personal digital assistant (PDA), a personal music player, a video player, a display device, a television, a television set-top box, a server, an intermediate network device, a mainframe computer, any mobile device, or any other type of device that processes and/or displays graphical data.

As illustrated in the example of FIG. 1, computing device 2 may include a hardware user input interface 4, a CPU 6, a memory controller 8, a system memory 10, a GPU 12, a graphics memory 14, a frame buffer 15, a display interface 16, a display 18 and buses 20 and 22. In some examples, graphics memory 14 may be "on-chip" with GPU 12. In some cases, all hardware elements shown in FIG. 1 may be on-chip, for example, in a system on a chip (SoC) design.

Hardware user input interface 4, CPU 6, memory controller 8, GPU 12 and display interface 16 may communicate with each other using bus 20. Memory controller 8 and system memory 10 may also communicate with each other using bus 22. Buses 20, 22 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may include a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute a GPU driver for controlling the operation of GPU 12. The user may provide input to computing device 2 via one or more input devices (not shown) such as a keyboard, a mouse, a microphone, a touch pad or another input device that is coupled to computing device 2 via hardware user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. The instructions may also conform to so-called heterogeneous computing libraries, such as OpenCL, and/or DirectCompute in various examples. In order to process the graphics rendering instructions, CPU 6 may issue one or more graphics rendering commands to GPU 12 (e.g., through a GPU driver) to cause GPU 12 to perform some or all of the rendering of the graphics data. In some examples, the graphics data to be rendered may include a list of graphics primitives, e.g., points, lines, triangles, quadrilaterals, triangle strips, etc.

Memory controller 8 facilitates the transfer of data going into and out of system memory 10. For example, memory controller 8 may receive memory read and write commands, and service such commands with respect to system memory 10 in order to provide memory services for the components in computing device 2. Memory controller 8 is communicatively coupled to system memory 10 via memory bus 22. Although memory controller 8 is illustrated in FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store a window manager application that is used by CPU 6 to present a graphical user interface (GUI) on display 18. In addition, system memory 10 may store user applications and application surface data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include multiple processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), DSPs, or other equivalent integrated or discrete logic circuitry.

GPU 12 may be directly coupled to graphics memory 14. Thus, GPU 12 may read data from and write data to graphics memory 14 without using bus 20. In other words, GPU 12 may process data locally using a local storage, instead of off-chip memory. This may allow GPU 12 to operate in a more efficient manner by helping to reduce a need for GPU 12 to read and write data (e.g., fetch) via bus 20, which may experience heavy bus traffic. In some instances, however, GPU 12 may not include a separate memory of sufficient size to store an entire image being processed, but instead may utilize system memory 10 via bus 20 to retrieve or fetch portions of the image to be used for processing. Graphics memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

CPU 6 and/or GPU 12 may store rendered image data in frame buffer 15. Frame buffer 15 may be an independent memory or may be is allocated within system memory 10. Display interface 16 may retrieve the data from frame buffer 15 and configure display 18 to display the image represented by the rendered image data. In some examples, display interface 16 may include a digital-to-analog converter (DAC) that is configured to convert the digital values retrieved from the frame buffer into an analog signal consumable by display 18. In some examples, display interface 16 may pass the digital values directly to display 18 for processing. Display 18 may include a monitor, a television, a projection device, a liquid crystal display (LCD), a plasma display panel, a light emitting diode (LED) array, such as an organic LED (OLED) display, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone. In some examples, display 18 may be a stand-alone device coupled to computer device 2 via a wired or wireless communications link. For instance, display 18 may be a computer monitor or flat panel display connected to a personal computer via a cable or wireless link.

Fetching unit 37 is configured to receive rendered image data in system memory 10 and store the received rendered data in graphics memory 14. Fetching unit 37 may be programmable and/or fixed function circuitry. For example, fetching unit 37 may operate GPU 12 in a more efficient manner by helping to reduce a need of GPU 12 to read and write data via bus 20 to access system memory 10.

Pixel processing pipeline 38 is configured to receive a source pixel associated with a rasterized primitive, and to perform one or more per-pixel operations on the source pixel. Per-pixel operations that may be performed by pixel processing pipeline 38 include, for example, but are not limited to, motion blur, depth of field blur, Gaussian blur, alpha testing, texture mapping, color computation, pixel shading, per-pixel lighting, fog processing, blending, pixel ownership testing, source alpha testing, stencil testing, depth testing, scissors testing and/or stippling operations.

According to one or more examples of this disclosure, rather than linearly rasterizing or processing two-dimensional data, GPU 12 may non-linearly rasterize or process the two-dimensional data to reduce overfetch. For example, fetching unit 37 may fetch for each two-dimensional matrix of multiple two-dimensional matrices of units of an image, a respective portion of the image data. For example, rather than fetching image data to process each unit arranged in a particular row of an image, fetching unit 37 may fetch image data to process a portion of units (e.g., 2) in a first row of the image and to process a portion of units (e.g., 2) in a second row of the image that is adjacent to the first row. In this way, image data used for processing the portion of units (e.g., 2) in a first row of the image may further be used to process the portion of units (e.g., 2), which may result in a reduced number of fetch operations compared to systems that linearly rasterize or process two-dimensional data. In this example, pixel processing pipeline 38 may process each two-dimensional matrix based on the respective portion of the image data to generate pixel data for the image. Although FIG. 1 describes, describes GPU 12 as performing one or more techniques of this disclosure, in some examples, a display processor, a CPU (e.g., CPU 6), a DSP, or any other processor may perform one or more techniques of this disclosure for processing two-dimensional data.

Figure 2:
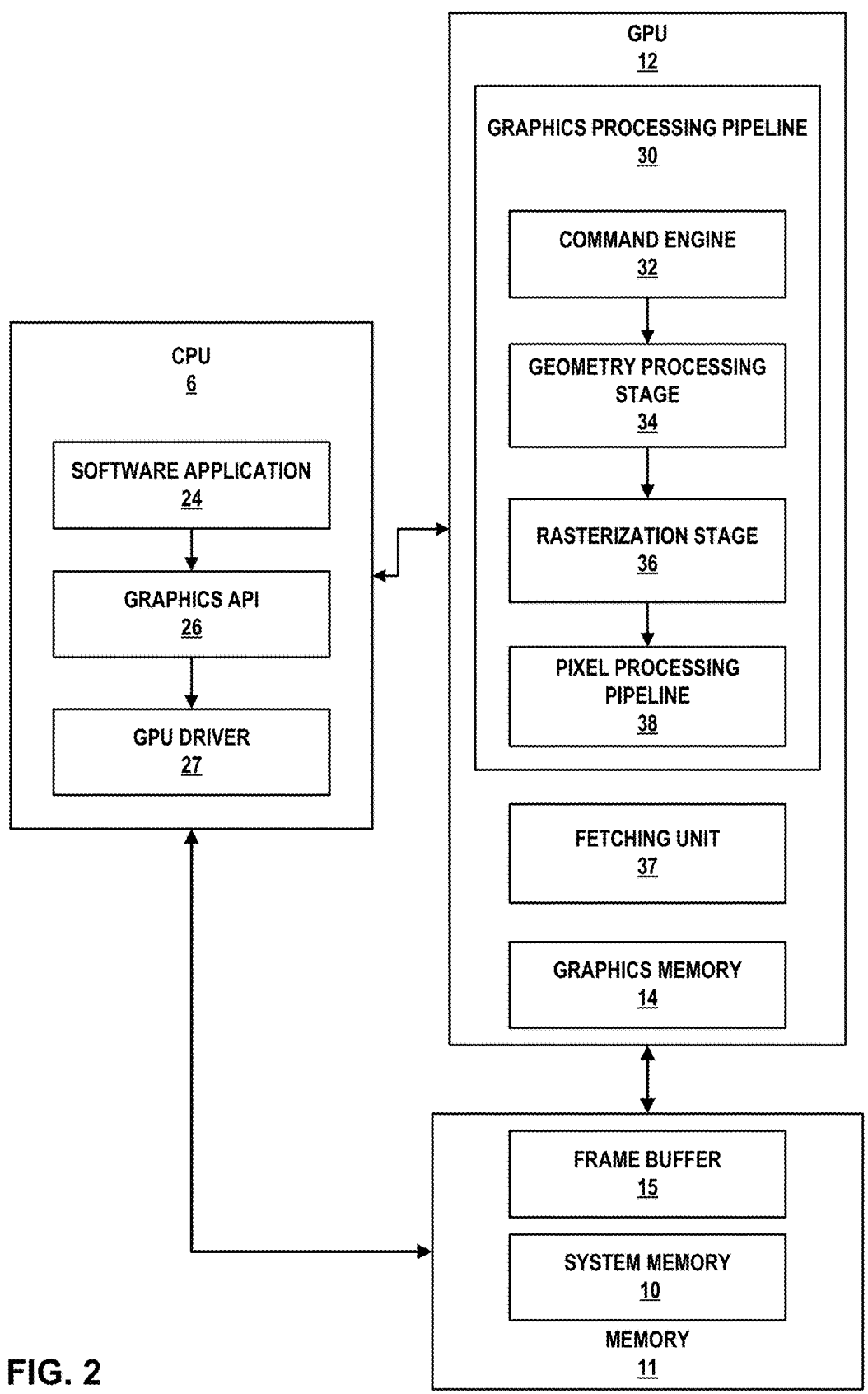
FIG. 2 is a block diagram illustrating example implementations of a central processing unit, a graphics processing unit, system memory, and a frame buffer of FIG. 1 in further detail.

FIG. 2 is a block diagram illustrating example implementations of CPU 6, GPU 12, system memory 10, and frame buffer 15 of FIG. 1 in further detail. CPU 6 may include at least one software application 24, a graphics API 26, and a GPU driver 27, each of which may be one or more software applications or services that execute on CPU 6. GPU 12 may include graphics memory 14, fetching unit 37, and a graphics processing pipeline 30 that includes multiple graphics processing stages that operate together to execute graphics processing commands.

As shown in FIG. 2, graphics processing pipeline 30 may include a command engine 32, a geometry processing stage 34, a rasterization stage 36, and a pixel processing pipeline 38. Each of the components in graphics processing pipeline 30 may be implemented as fixed-function components, programmable components (e.g., as part of a shader program executing on a programmable shader unit), or as a combination of fixed-function and programmable components.

Memory available to CPU 6 and GPU 12 may include, for example, system memory 10 and frame buffer 15. As shown, in some examples, frame buffer 15 and system memory 10 may be respective portions of memory 11. Memory 11 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media. In some examples, however, frame buffer 15 may be separate from system memory 10. For example, frame buffer 15 may be included in memory 11 and system memory 10 may be separate from memory 11. Frame buffer 15 may store rendered pixel data (e.g., destination pixels).

Software application 24 may be any application that utilizes the functionality of GPU 12. For example, software application 24 may be a GUI application, an operating system, a portable mapping application, a computer-aided design program for engineering or artistic applications, a video game application, or another type of software application that uses 2D or 3D graphics.

Software application 24 may include one or more drawing instructions that instruct GPU 12 to render a GUI and/or a graphics scene. For example, the drawing instructions may include instructions that define a set of one or more graphics primitives to be rendered by GPU 12. In some examples, the drawing instructions may, collectively, define all or part of multiple windowing surfaces used in a GUI. In additional examples, the drawing instructions may, collectively, define all or part of a graphics scene that includes one or more graphics objects within a model space or world space defined by the application.

Software application 24 may invoke GPU driver 27, via graphics API 26, to issue one or more commands to GPU 12 for rendering one or more graphics primitives into displayable graphics frames. In various examples, the commands may include so-called "packets" of data which may include commands, as well as other information related to rendering a scene (i.e. one or more frames). For example, software application 24 may invoke GPU driver 27, via graphics API 26, to provide primitive definitions to GPU 12. In some instances, the primitive definitions may be provided to GPU 12 in the form of a list of drawing primitives, e.g., triangles, rectangles, triangle fans, triangle strips, etc.

The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by software application 24 to GPU driver 27, GPU driver 27 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to system memory 10 associated with a display device.

GPU driver 27 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs.

A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

GPU driver 27 may also send commands, e.g. command packets that may include one or more commands, headers, render scene descriptors, buffers, etc., to GPU 12 that define the rendering mode that GPU 12 should use when rendering an image or a portion of an image.

Graphics processing pipeline 30 may be configured to receive one or more graphics processing commands from CPU 6, via GPU driver 27, and to execute the graphics processing commands to generate displayable graphics frames. As discussed above, graphics processing pipeline 30 includes multiple stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit.

Command engine 32 may receive graphics processing commands and configure the remaining processing stages within graphics processing pipeline 30 to perform various operations for carrying out the graphics processing commands. Command engine 32 may receive the command packet from GPU driver 27. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates, and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates.

Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division, and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader, or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate multiple source pixels that correspond to the rasterized primitive. In some examples, rasterization stage 36 may determine which screen pixel locations are covered by the primitive to be rasterized, and generate a source pixel for each screen pixel location determined to be covered by the primitive.

Rasterization stage 36 may determine which screen pixel locations are covered by a primitive by using techniques known to those of skill in the art, such as, e.g., an edge-walking technique, evaluating edge equations, etc. Rasterization stage 36 may store the resulting image data (e.g., source pixels) to system memory 10, which may be further processed by pixel processing pipeline 38.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

System memory 10 stores source pixels for GPU 12. Each source pixel may be associated with a unique unit of an image. For example, each source pixel may be associated with a unit arranged at a respective row and column of the image. In some examples, an image may be divided into two-dimensional matrices. In this example, each unit of an image may be arranged in a two-dimensional matrix of the two-dimensional matrices. As discussed further below, GPU 12 may non-linearly process an image by processing two-dimensional matrices of units rather than linearly processing the image (e.g., processing each row or column of units of the image). Although frame buffer 15 and system memory 10 are illustrated as being separate memory units, in other examples, frame buffer 15 may be part of system memory 10.

Fetching unit 37 is configured to retrieve or fetch rendered image data in system memory 10 and store the received rendered data in graphics memory 14. For example, fetching unit 37 may help to operate GPU 12 in a more efficient manner by helping to reduce a need of GPU 12 to read and write data via bus 20 to access system memory 10.

In some examples, fetching unit 37 may determine whether image data to be fetched for storage at graphics memory 14 is accessible at graphics memory 14. For example, rather than necessarily fetching image data for a particular pixel, fetching unit 37 may refrain from fetching the image data for the particular pixel when the image data for the particular pixel is accessible at graphics memory 14. In this example, fetching unit 37 may fetch the image data for the particular pixel when the image data for the particular pixel is not accessible at graphics memory 14. In this way, fetching unit 37 may reduce a number of fetches to system memory 10 compared to systems that fetch particular image data from system memory 10 for storage at graphics memory 14 when the particular image is already accessible at graphics memory 14.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha testing, texture mapping, color computation, pixel shading, per-pixel lighting, fog processing, blending, pixel ownership testing, source alpha testing, stencil testing, depth testing, scissors testing and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in frame buffer 15. The destination pixel data may be associated with a destination pixel in frame buffer 15 that has the same display location as the source pixel that was processed. The destination pixel data may include data such as, e.g., color values, destination alpha values, depth values, etc.

Frame buffer 15 stores destination pixels for GPU 12. Each destination pixel may be associated with a unique screen pixel location. In some examples, frame buffer 15 may store color components and a destination alpha value for each destination pixel. For example, frame buffer 15 may store red, green, blue, alpha (RGBA) components for each pixel where the "RGB" components correspond to color values and the "A" component corresponds to a destination alpha value.

In accordance with one or more examples of this disclosure, rather than linearly rasterizing or processing two-dimensional data, pixel processing pipeline 38 may non-linearly rasterize or process the two-dimensional data to reduce overfetch. For example, pixel processing pipeline 38 may process units arranged in a two-dimensional matrix for an image, where the two-dimensional matrix includes one or more units (e.g., 2) arranged in a first row of the image and one or more units (e.g., 2) arranged in a second row of the image that is adjacent to the first row of the image. In this example, fetching unit 37 may fetch image data for the one or more units arranged in the first row of the image and may fetch addition image data for processing one or more units arranged in a second row of the image that was not previously fetched for the one or more units arranged in the first row of the image. In this way, pixel processing pipeline 38 may use image data to process units arranged in the second row of the image that was previously fetched for processing units arranged in the first row the first two-dimensional matrix, which may result in a reduced number of fetch operations compared to systems that linearly rasterize or process two-dimensional data. As explained in further detail below, non-linearly rasterizing or processing the two-dimensional may help to reduce a number of times data is fetched from system memory 10 and/or frame buffer 15, which may reduce a power consumption of GPU 12.

Figure 3:
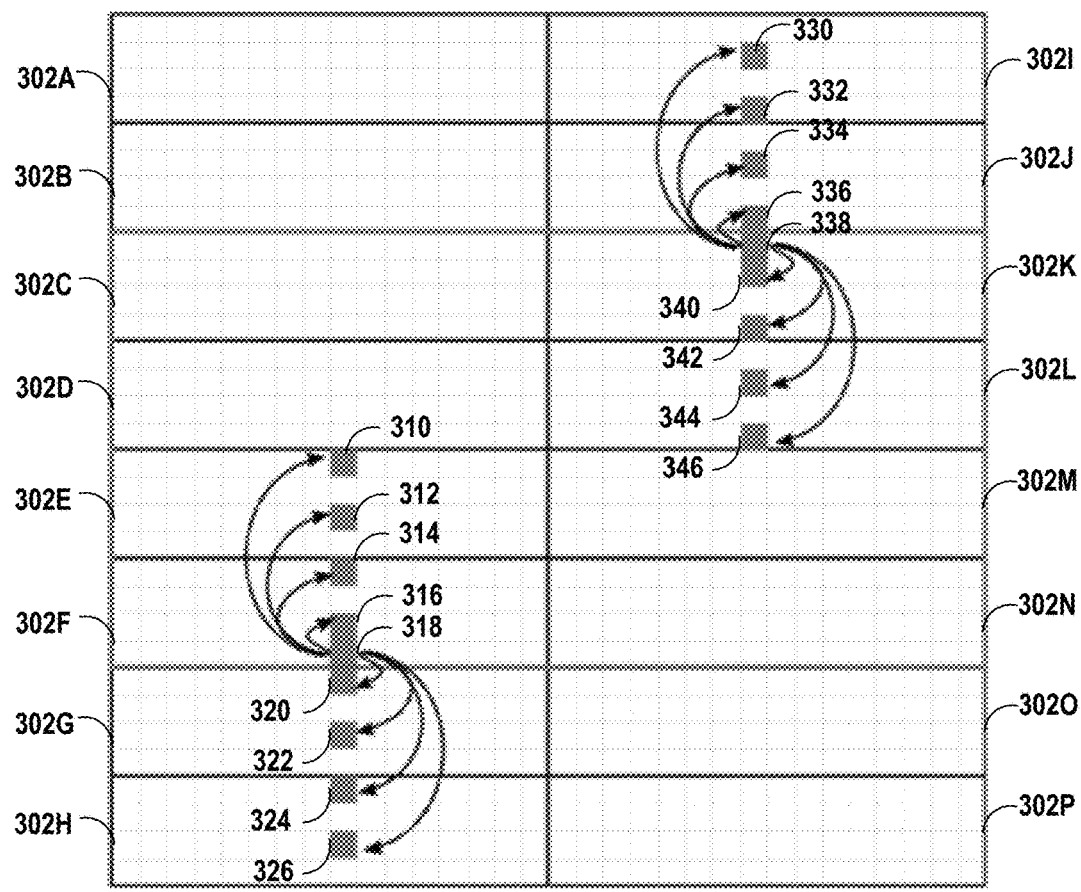
FIG. 3 is an illustration of processing two-dimensional data along a vertical direction in accordance with the techniques of this disclosure.
Figure 3:
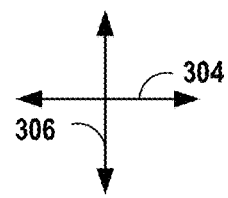

FIG. 3 is an illustration of a processing two-dimensional data along a vertical direction in accordance with the techniques of this disclosure. As shown, image 300 includes units 302A-302P (collectively, units 302). Although each unit of units 302 is illustrated as being elongated along horizontal direction 304 (e.g., more pixels along horizontal direction 304 than vertical direction 306), in some examples, each unit of units 302 may be square (e.g., equal number of pixels along horizontal direction 304 and vertical direction 306) or elongated along vertical direction 306 (e.g., fewer pixels along horizontal direction 304 than vertical direction 306). As shown in FIG. 3, processing pixels in a particular unit (e.g., 302F) may use image data from units above and below the particular unit. As discussed further in FIGS. 5A-5C, linearly processing an entire row of an image may result in overfetch, particularly when processing is along a vertical direction.

Each unit of units 302 may include multiple pixels. For example, unit 302E includes pixels 310 and 312, unit 302F includes pixels 314, 316, and 318, unit 302G includes pixels 320 and 322, unit 302H includes pixels 324 and 326. As shown, unit 302I includes pixels 330 and 332, unit 302J includes pixels 334 and 336, unit 302K includes pixels 338, 340 and 342, unit 302L includes pixels 344 and 346.

In the example of FIG. 3, to process pixel 318 of unit 302F, fetching unit 37 may fetch two-dimensional image data from neighboring units (e.g., units 302E, 302G, and 302H) that are arranged above or below unit 302F. For instance, fetching unit 37 may fetch image data from neighboring units for processing pixel 318 that is not already in cache (e.g., graphics memory 14). In this instance, to process pixel 318, pixel processing pipeline 38 may process image data from units 302E, 302F, 302G, and 302H. For example, pixel processing pipeline 38 may process (e.g., vertical blur processing) pixel 318 using image data from pixels 310-316 and 320-326.

As used herein, two-dimensional image data may refer to image data of two or more pixels arranged on different points along horizontal direction 304 and two or more pixels arranged on different points along the vertical axis direction 306. Two-dimensional data may include one or more of RGB data, RGBA data, chroma data, luma data, alpha data, or other two-dimensional data.

Similarly, to process pixel 338 of unit 302K, fetching unit 37 may fetch image data for neighboring units (e.g., units 302I, 302J, and 302L) that are arranged above or below unit 302K. For instance, fetching unit 37 may fetch image data from neighboring units for processing pixel 338 that is not already in cache (e.g., graphics memory 14). In this instance, to process pixel 338, pixel processing pipeline 38 may process image data from units 302I, 302J, 302K, and 302L. For example, pixel processing pipeline 38 may process (e.g., vertical blur processing) pixel 338 using image data from pixels 330-336 and 340-346.

As an example, the processing illustrated in FIG. 3, may be implemented as shown in the following pseudo-code.

```
{
    vec4 s = vec4(0.0);
    for (int i = 0; i < KS; i++)
    {
#if defined HORIZONTAL
        /*highp*/ vec2 offset = vec2(gauss_offsets[i],0.0);
#elif defined VERTICAL
        /*highp*/ vec2 offset = vec2(0.0,gauss_offsets[i]);
#endif
        float w = gauss_weights[i];
        s += w * texture( texture_unit0, out_texcoord0 + offset);
    }
    frag_color = s;
}
```

In the above, KS corresponds to a number of pixels used to blur, vec2 offset corresponds to an offset to be applied to a current pixel location (e.g., [x,y]), gauss_offsets corresponds to a predetermined value, float w corresponds to a predetermined weight value, out_texcoord0 corresponds to a current pixel position, and fragment color corresponds to the output of the blurred pixel.

Figure 4:
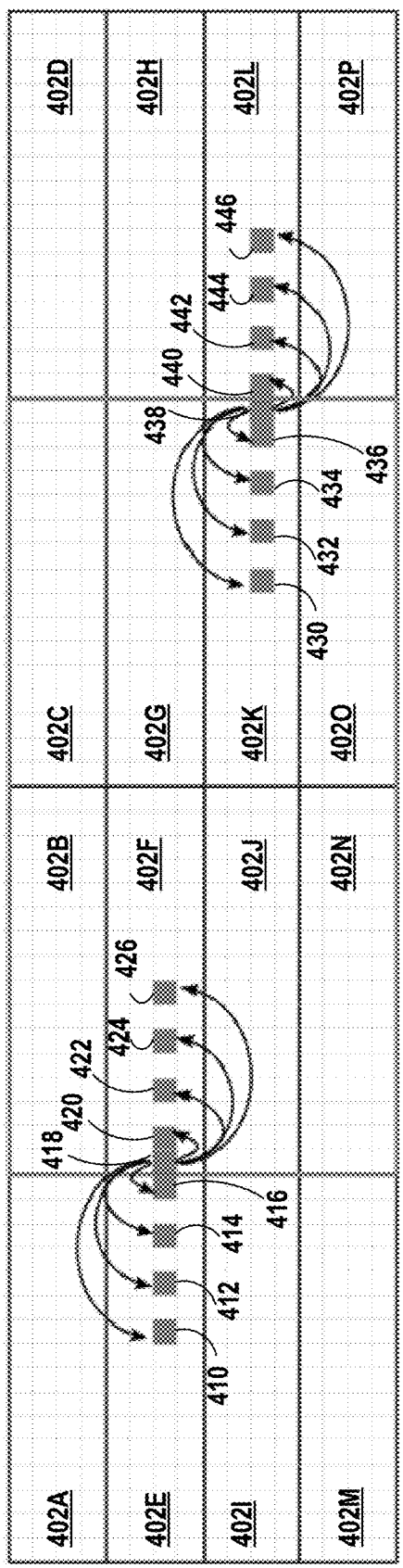
FIG. 4 is an illustration of processing two-dimensional data along a horizontal direction in accordance with the techniques of this disclosure.
Figure 4:
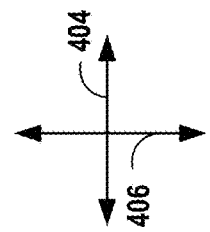

FIG. 4 is an illustration of processing two-dimensional data along a horizontal direction in accordance with the techniques of this disclosure. As shown, image 400 includes units 402A-402P (collectively, units 402). Although each unit of units 402 is illustrated as being elongated along horizontal direction 404, in some examples, each unit of units 402 may be square or elongated along vertical direction 406.

Each unit of units 402 may include multiple pixels. For example, unit 402E includes pixels 410, 412, 414, and 416, unit 402F includes pixels 418, 420, 422, 424, and 426. As shown, unit 402k includes pixels 430, 432, 434, 436, and 438, unit 402L includes pixels 440, 442, 444, and 446.

In the example of FIG. 4, to process pixel 418 of unit 402F, fetching unit 37 may fetch image data for a neighboring unit (e.g., unit 402E) that is arranged to the left or right of unit 402F. For instance, fetching unit 37 may fetch image data from neighboring units for processing pixel 418 that is not already in cache (e.g., graphics memory 14). In this instance, to process pixel 418, pixel processing pipeline 38 may process image data from units 402E and 402F. For example, pixel processing pipeline 38 may process (e.g., horizontal blur processing) pixel 418 using image data from pixels 410-416 and 420-426.

Similarly, to process pixel 438 of unit 402K, fetching unit 37 may fetch image data for a neighboring unit (e.g., unit 402L) that is arranged to the left or right of unit 402K. For instance, fetching unit 37 may fetch image data from neighboring units for processing pixel 438 that is not already in cache (e.g., graphics memory 14). In this instance, to process pixel 438, pixel processing pipeline 38 may process image data from units 402K and 402L. For example, pixel processing pipeline 38 may process (e.g., horizontal blur processing) pixel 418 using image data from pixels 430-436 and 440-446.

Figure 5A:
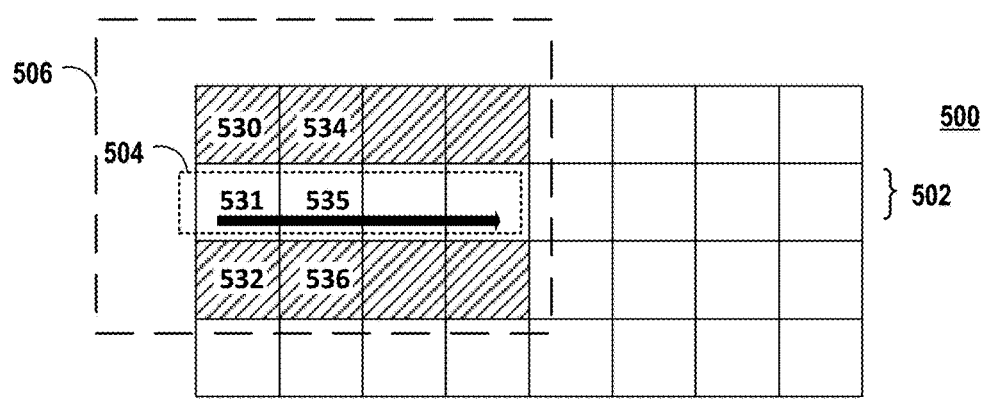
FIG. 5A is an illustration of linearly processing a first portion of a first row of units of an image.

FIG. 5A is an illustration of linearly processing a first portion 504 of a first row 502 of units of an image 500. As discussed further below, FIGS. 5A-5C illustrate an example of linearly processing an image that may result in higher overfetch compared to systems that non-linearly process an image.

In the example of FIG. 5A, pixel processing pipeline 38 may use image data for two-dimensional matrix 506 of units of image 500 to process first portion 504 of first row 502 of units of image 500. More specifically, for example, fetching unit 37 may fetch image data for units 530-532 and pixel processing pipeline 38 may process unit 531 using image data for units 530-532 (e.g., apply a vertical Gaussian blur). After processing unit 531, fetching unit 37 may fetch image data for units 534-536 and pixel processing pipeline 38 may process unit 535 using image data for units 534-536. In this way, pixel processing pipeline 38 may linearly process first portion 504 using image data for two-dimensional matrix 506.

Figure 5B:
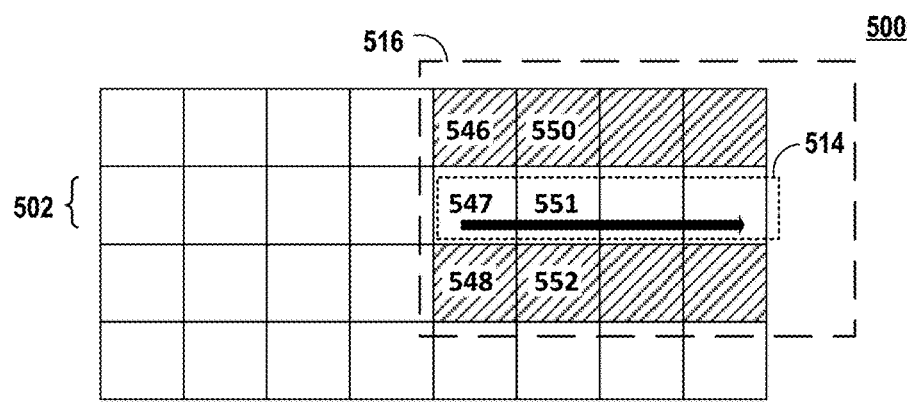
FIG. 5B is an illustration of linearly processing a second portion of a first row of units of the image of FIG. 5A.

FIG. 5B is an illustration of linearly processing a second portion 514 of first row 502 of units of the image 500 of FIG. 5A. In this example, pixel processing pipeline 38 may use image data for two-dimensional matrix 516 of units of image 500 to process second portion 514 of first row 502 of units of image 500. More specifically, for example, fetching unit 37 may fetch image data for units 546-548. However, in the example of FIGS. 5A-5C, fetching unit 37 is configured for a cache size configured to store image data for 12 pixels, as such, fetching unit 37 may thrash pixel data for units 530-532 to permit storage of pixel data for units 546-548. In this example, pixel processing pipeline 38 may process unit 547 using image data for units 546-548. After processing unit 547, fetching unit 37 may fetch image data for units 550-552. Similarly, fetching unit 37 may thrash pixel data for units 534-536 to permit storage of pixel data for units 550-552. In this example, pixel processing pipeline 38 may process unit 551 using image data for units 550-552. In this way, processing second portion 514 may thrash image data that was previously fetched when processing first portion 512 (e.g., image data for units 530-532 and 534-536) to process second portion 514.

Figure 5C:
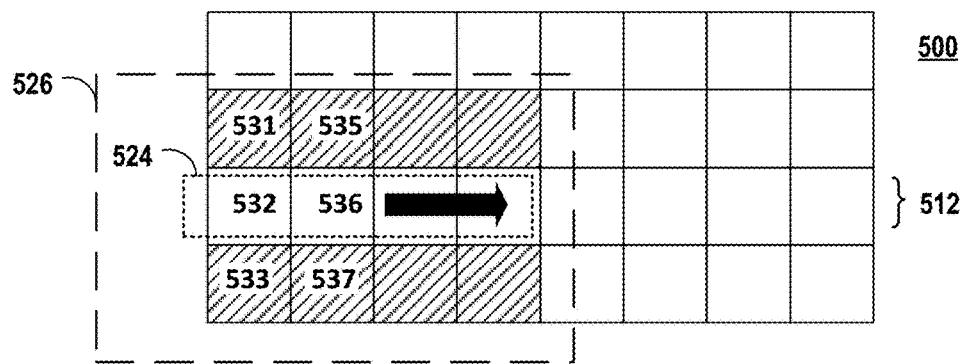
FIG. 5C is an illustration of linearly processing a first portion of a second row of units of the image of FIG. 5A.

FIG. 5C is an illustration of linearly processing a first portion 524 of a second row 512 of units of the image 500 of FIG. 5A. In this example, pixel processing pipeline 38 may use image data for two-dimensional matrix 526 of units of image 500 to process first portion 524 of second row 504 of units of image 500. More specifically, for example, fetching unit 37 may thrash pixel data for units 546-548, fetch image data for unit 533 for a first time, and fetch image data for units 531-532 again (e.g., overfetch). In this example, pixel processing pipeline 38 may process unit 532 using image data for units 531-533. After processing unit 532, fetching unit 37 may thrash pixel data for units 550-552, fetch image data for unit 537 for a first time, and fetch image data for units 535-536 again (e.g., overfetch). In this example, pixel processing pipeline 38 may process unit 536 using image data for units 535-537. In this way, pixel processing pipeline 38 may linearly process first portion 524 using image data for two-dimensional matrix 526, which results in overfetch.

Figure 6A:
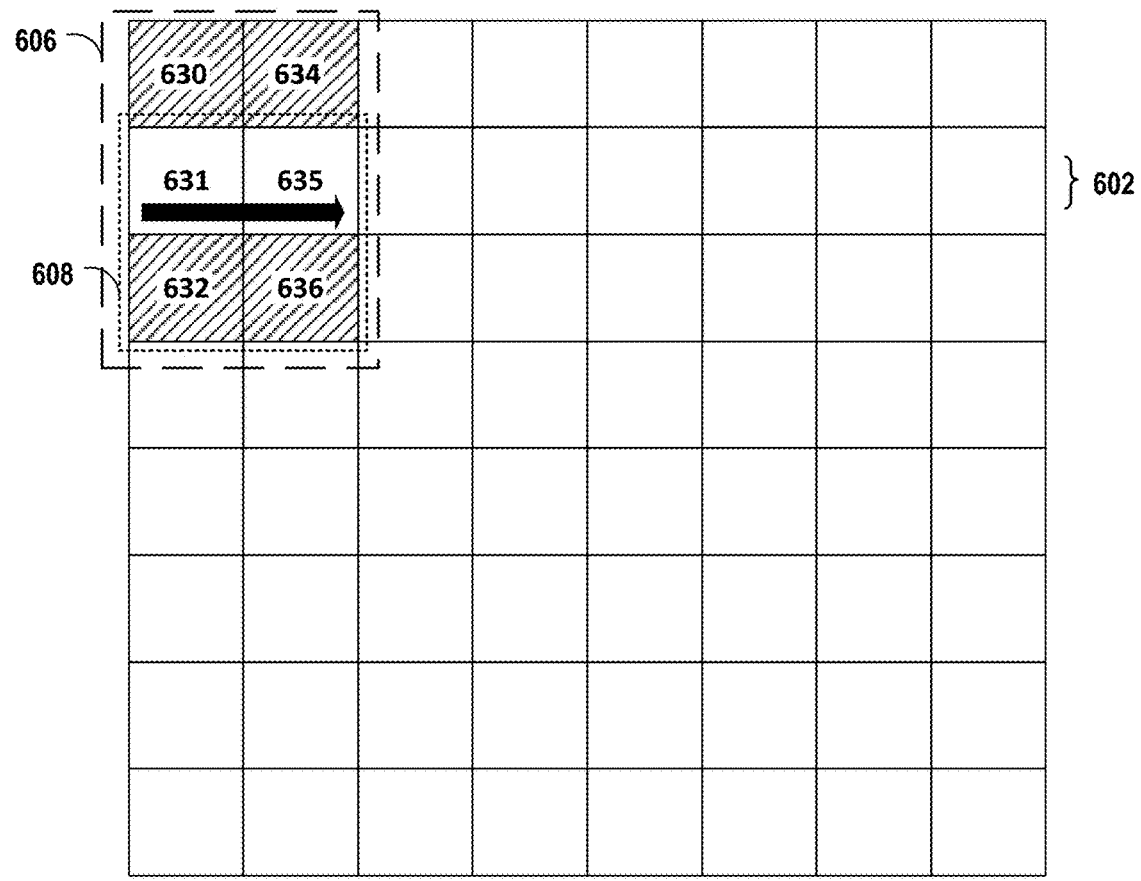
FIG. 6A is an illustration of non-linearly processing a first row of units of an image in accordance with the techniques of this disclosure.

FIG. 6A is an illustration of non-linearly processing a first row 602 of units of an image 600 in accordance with the techniques of this disclosure. In the example of FIG. 6A, pixel processing pipeline 38 may use image data for two-dimensional matrix 606 of image 600 to perform non-linear processing of first row 602 of first two-dimensional matrix 608. More specifically, for example, fetching unit 37 may fetch image data for units 630-632 and pixel processing pipeline 38 may process unit 631 using image data for units 630-632. After processing unit 631, fetching unit 37 may fetch image data for units 634-636 and pixel processing pipeline 38 may process unit 635 using image data for units 634-636.

Figure 6B:
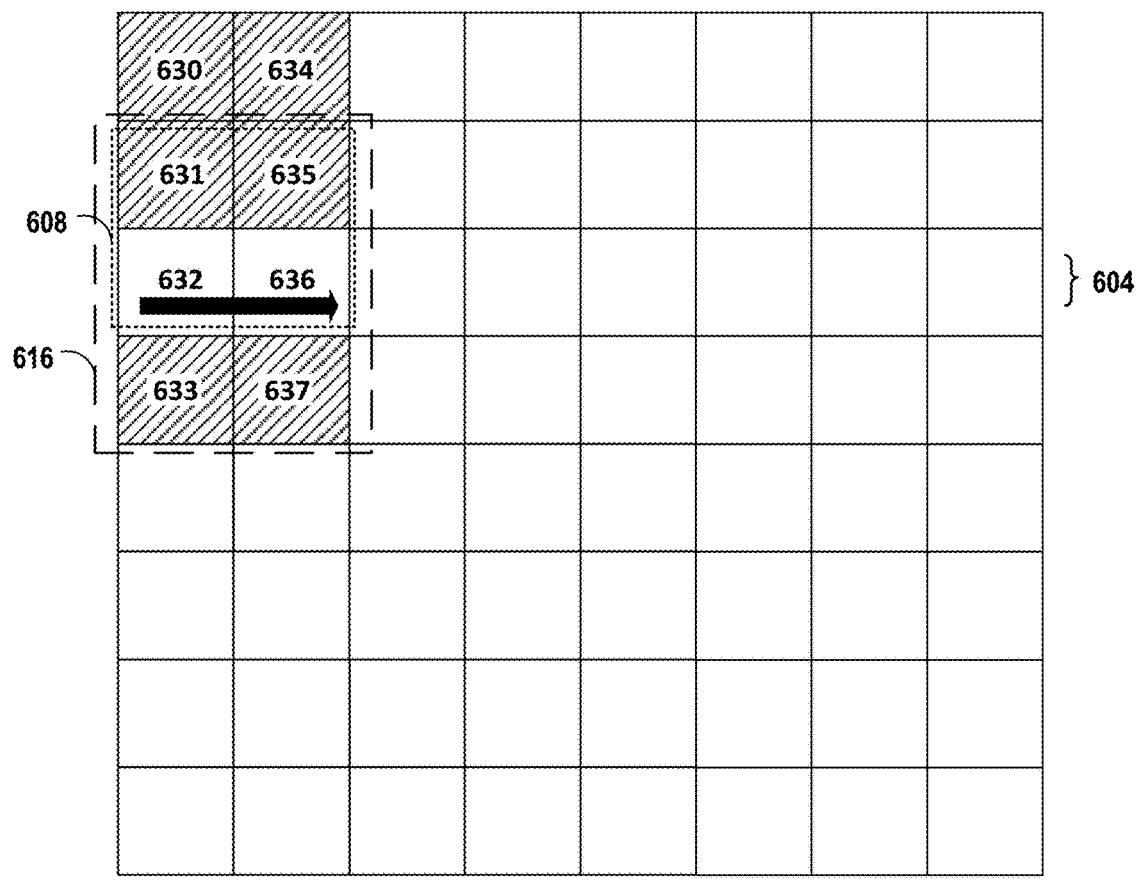
FIG. 6B is an illustration of non-linearly processing a second row of units of the image of FIG. 6A in accordance with the techniques of this disclosure.

FIG. 6B is an illustration of non-linearly processing a second row 604 of units of the image 600 of FIG. 6A in accordance with the techniques of this disclosure. In the example of FIG. 6B, pixel processing pipeline 38 may use image data for two-dimensional matrix 616 to perform non-linear processing of second row 604 of first two-dimensional matrix 608. However, fetching unit 37 may refrain from fetching image data for units 631, 632, 635, and 636 because image data for units 631, 632, 635, and 636 is already accessible in cache (e.g., graphics memory 14) when pixel processing pipeline 38 performed non-linear processing of first row 602 of first two-dimensional matrix 608 as shown in FIG. 6A. As such, fetching unit 37 may fetch only image data for units 633 and 637 to process units 632 and 636. More specifically, for example, fetching unit 37 may fetch image data for unit 633 and pixel processing pipeline 38 may process unit 632 using image data for units 631-633. After processing unit 632, fetching unit 37 may fetch image data for unit 637 and pixel processing pipeline 38 may process unit 636 using image data for units 635-637.

Accordingly, pixel processing pipeline 38 may be configured to perform non-linearly processing (e.g., recursively processing) such that a number of overfetches is reduced compared to systems that linearly process two-dimensional data. Said differently, for example, pixel processing pipeline 38 may process second row 604 of units of first two-dimensional matrix 608 based on the image data for two-dimensional matrix 606 of FIG. 6A that was previously fetched to process first row 602 of units of a first two-dimensional matrix 608 and based on image data for two-dimensional matrix 616 of units. In this way, pixel processing pipeline 38 may process second row 604 of units of first two-dimensional matrix 608 using image data previously fetched for processing first row 602 of units of a first two-dimensional matrix 608 to reduce an amount of overfetch.

Figure 6C:
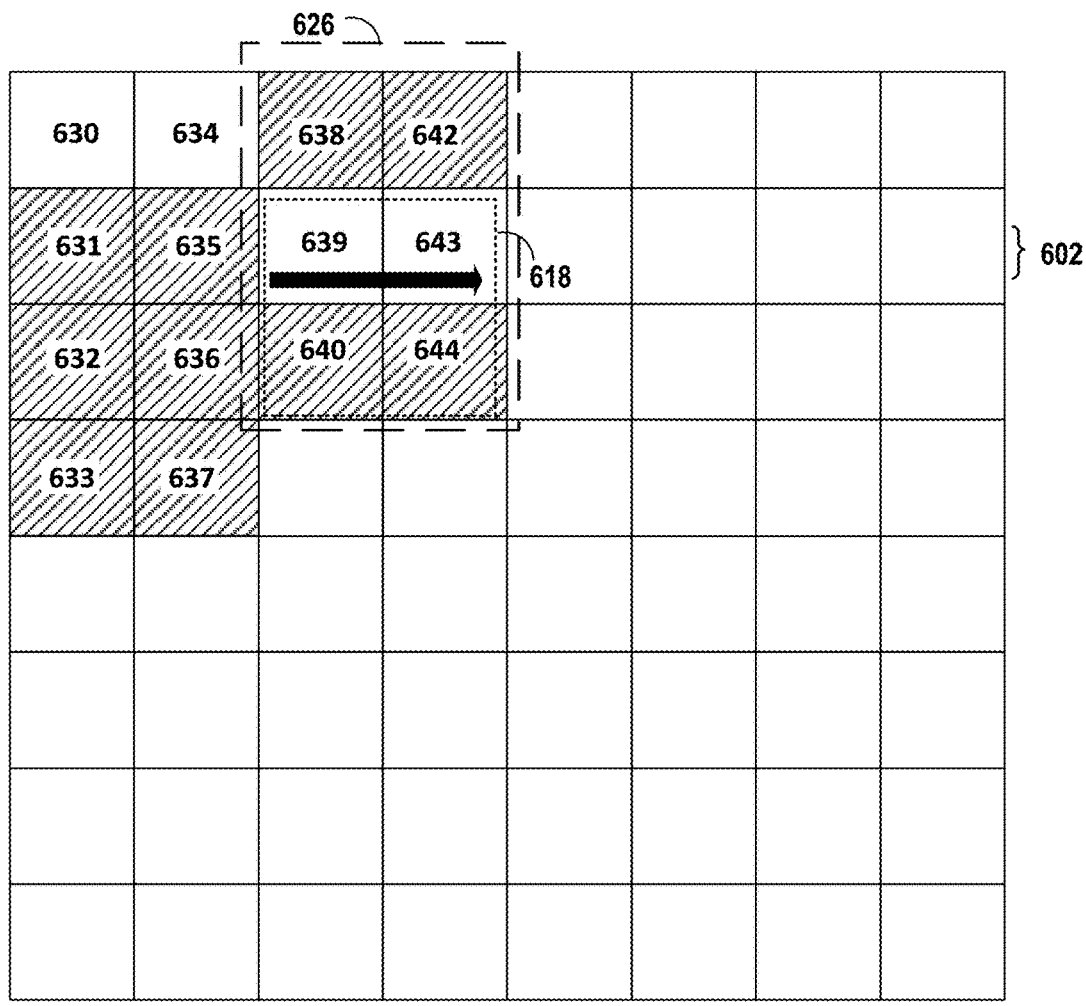
FIG. 6C is an illustration of non-linearly processing a first row of units of the image of FIG. 6A in accordance with the techniques of this disclosure.

FIG. 6C is an illustration of non-linearly processing a first row 602 of units of the image 600 of FIG. 6A in accordance with the techniques of this disclosure. In the example of FIG. 6C, pixel processing pipeline 38 may use image data for two-dimensional matrix 626 of units of image 600 to perform non-linear processing of first row 602 of second two-dimensional matrix 618. More specifically, for example, fetching unit 37 may fetch image data for units 638-640 and pixel processing pipeline 38 may process unit 639 using image data for units 638-640. After processing unit 639, fetching unit 37 may fetch image data for units 642-644. However, in the example of FIGS. 6A-6C, fetching unit 37 is configured for a cache size configured to store image data for 12 pixels, as such, fetching unit 37 may thrash pixel data for units 630, 634 to permit storage of pixel data for units 643-644. In this example, pixel processing pipeline 38 may process unit 643 using image data for units 642-644.

Figure 6D:
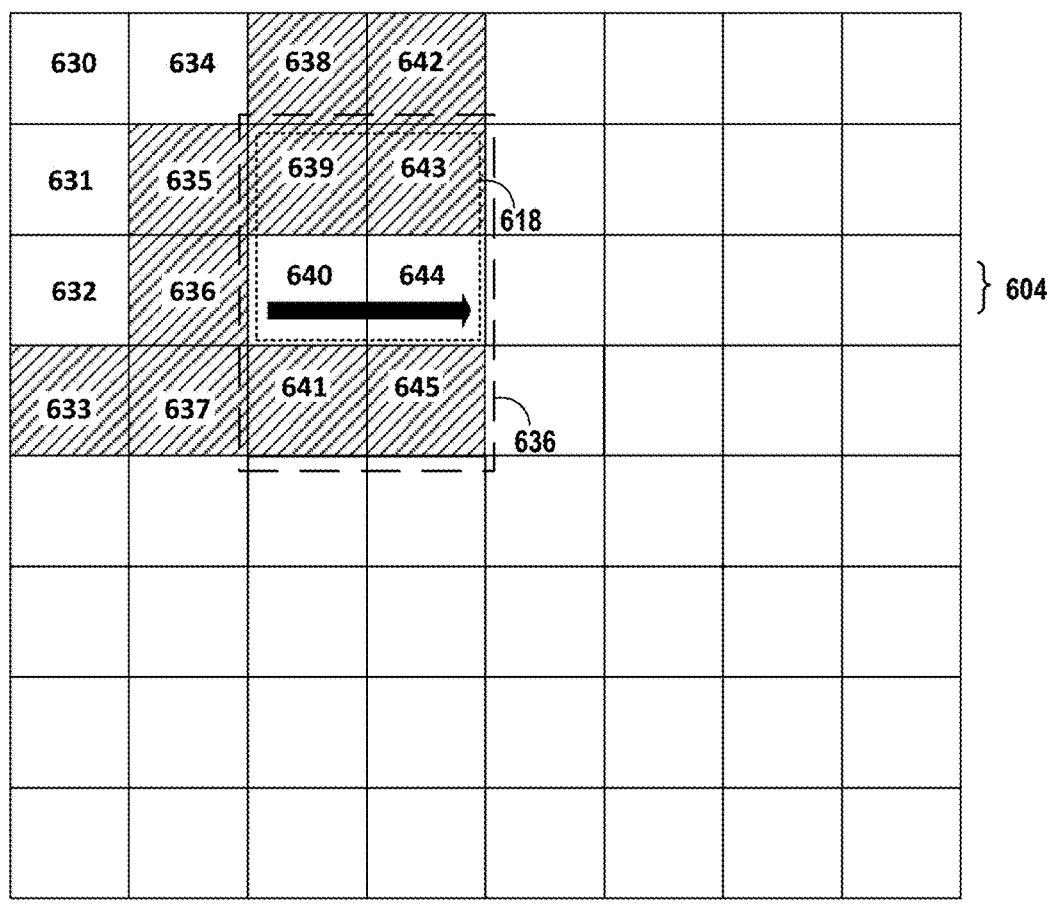
FIG. 6D is an illustration of non-linearly processing a second row of units of the image of FIG. 6A in accordance with the techniques of this disclosure.

FIG. 6D is an illustration of non-linearly processing a second row 604 of units of the image 600 of FIG. 6A in accordance with the techniques of this disclosure. In the example of FIG. 6D, pixel processing pipeline 38 may use image data for two-dimensional matrix 636 of units of image 600 to perform non-linear processing of second row 604 of second two-dimensional matrix 618. More specifically, for example, fetching unit 37 may thrash pixel data for unit 631 and fetch image data for unit 641. In this example, pixel processing pipeline 38 may process unit 640 using image data for units 639-641. After processing unit 640, fetching unit 37 may thrash pixel data for unit 632 and fetch image data for unit 645. In this example, pixel processing pipeline 38 may process unit 644 using image data for units 643-645. In this way, pixel processing pipeline 38 may process second row 604 of units of second two-dimensional matrix 618 using image data previously fetched for processing first row 602 of units of a second two-dimensional matrix 618 to reduce an amount of overfetch.

One or more techniques described herein may decrease an overfetch for processing two-dimensional data. In a Gaussian blur vertical and horizontal example, an 8×8 super group may fit in 128 KB L2 cache (e.g., graphics memory 14 of FIG. 1). In this example, a decrease overfetch from ~50% to ~10% may be observed for Gaussian blur vertical. In this example, an increase overfetch from ~0% to ~10% for Gaussian blur horizontal may be observed. In this example, combining the decrease overfetch observed for Gaussian blur vertical and the increase overfetch for Gaussian blur horizontal may result in a decrease overfetch from ~33% to ~10%.

One or more benefits of using one or more techniques for non-linearly processing may be further increased from the Gaussian blur vertical and horizontal example, such as, for example, but not limited to, stride blur, motion blur, and other cases with a relatively large range can be performed, for example, using one or more techniques described below.

Figure 7:
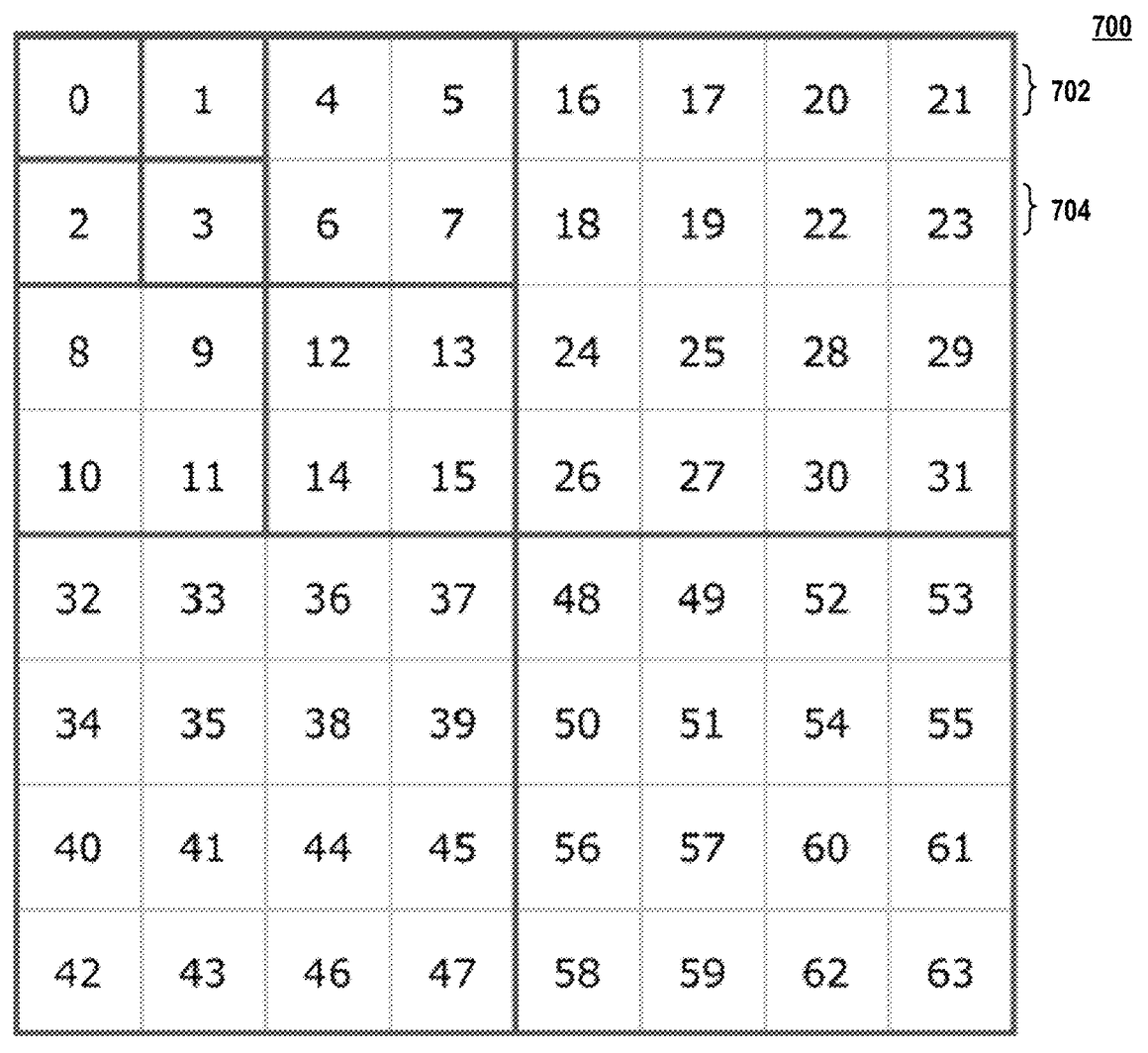

FIG. 7 is an illustration of recursively processing a square group of units in accordance with the techniques of this disclosure. In the exemplary spatial locality technique of FIG. 7, GPU 12 may be configured to non-linearly process two-dimensional data of an image 700 that includes units 1-63. For example, pixel processing pipeline 38 may process two-dimensional data for units arranged at first row 702 of image 700. For instance, pixel processing pipeline 38 may process two-dimensional data for units 0 and 1. In this example, pixel processing pipeline 38 may process two-dimensional data for units arranged at a second row 704 of image 700 (e.g., units 2 and 3) before processing two-dimensional data for all of the units arranged in the first row 702 (e.g., units 4, 5, 16, 17, 20, and 21).

In the example of FIG. 7, pixel processing pipeline 38 may utilize a recursive technique. For example, pixel processing pipeline 38 may process units for image 700 in an order that processes units arranged in a first square (e.g., units 0-3) of the image before processing units arranged in a second square (e.g., units 0-15) that includes the first square. In the example of FIG. 7, pixel processing pipeline 38 may process a subset of the two-dimensional matrices. For example, pixel processing pipeline 38 may process a square matrix that includes units 0-15 by processing each of a square matrix that includes units 0-3, a square matrix that includes units 4-7, a square matrix that includes units 8-11, and a square matrix that includes units 12-15.

GPU 12 may process two-dimensional data in a manner that adapts to cache size, image format, and other factors. Examples of image format may include, but are not limited to, for example, an RGBA configured for 8 bits per channel, an RGB configured for 5 bits for red, 6 bits for green, and 5 bits for blue, or another image format. For example, fetching unit 37 may store two-dimensional data based on a cache size (e.g., size of system memory 10), image format, or another factor. For instance, when a cache is relatively small (e.g., 8 KB L2 cache), graphics memory 14 may store two-dimensional data for processing units 0-3 before thrashing occurs. In some instances, when graphics memory 14 is moderately sized (e.g., 32 KB L2 cache) graphics memory 14 may store two-dimensional data for processing units 0-15 before thrashing occurs. In some instances, when graphics memory 14 is relatively large (e.g., 128 KB L2 cache), graphics memory 14 may store two-dimensional data for processing units 0-63 before thrashing occurs. This recursive rasterization may adapt to different cache sizes (e.g., small, medium, large, etc.).

The rasterization process may generate a horizontal position and a vertical position of a sequence of units. In the example of FIG. 7 the units are arranged in a power of two square configuration. GPU 12 may calculate a horizontal position of each unit using odd bits of an index. For instance, in response to determining that odd bits for an index value "011001" corresponding to 25 are "101" or a '5', fetching unit 37 and/or pixel processing pipeline 38 may calculate the horizontal position of index value "011001" as "101" or a '5'. Similarly, GPU 12 may calculate a vertical position of each unit using even bits of the index. For instance, in response to determining that even bits for the index value are "010" or '2', fetching unit 37 and/or pixel processing pipeline 38 may determine that calculate the vertical position of index value "011001" as "010" or '2'.

In the example of FIG. 7, the two-dimensional data to be processed by GPU 12 is arranged in an 8 unit by 8 unit square. In some examples, however, GPU 12 may be configured to process units within a non-square shape or non-power 2 square configuration, as illustrated in FIG. 8.

Figure 8:
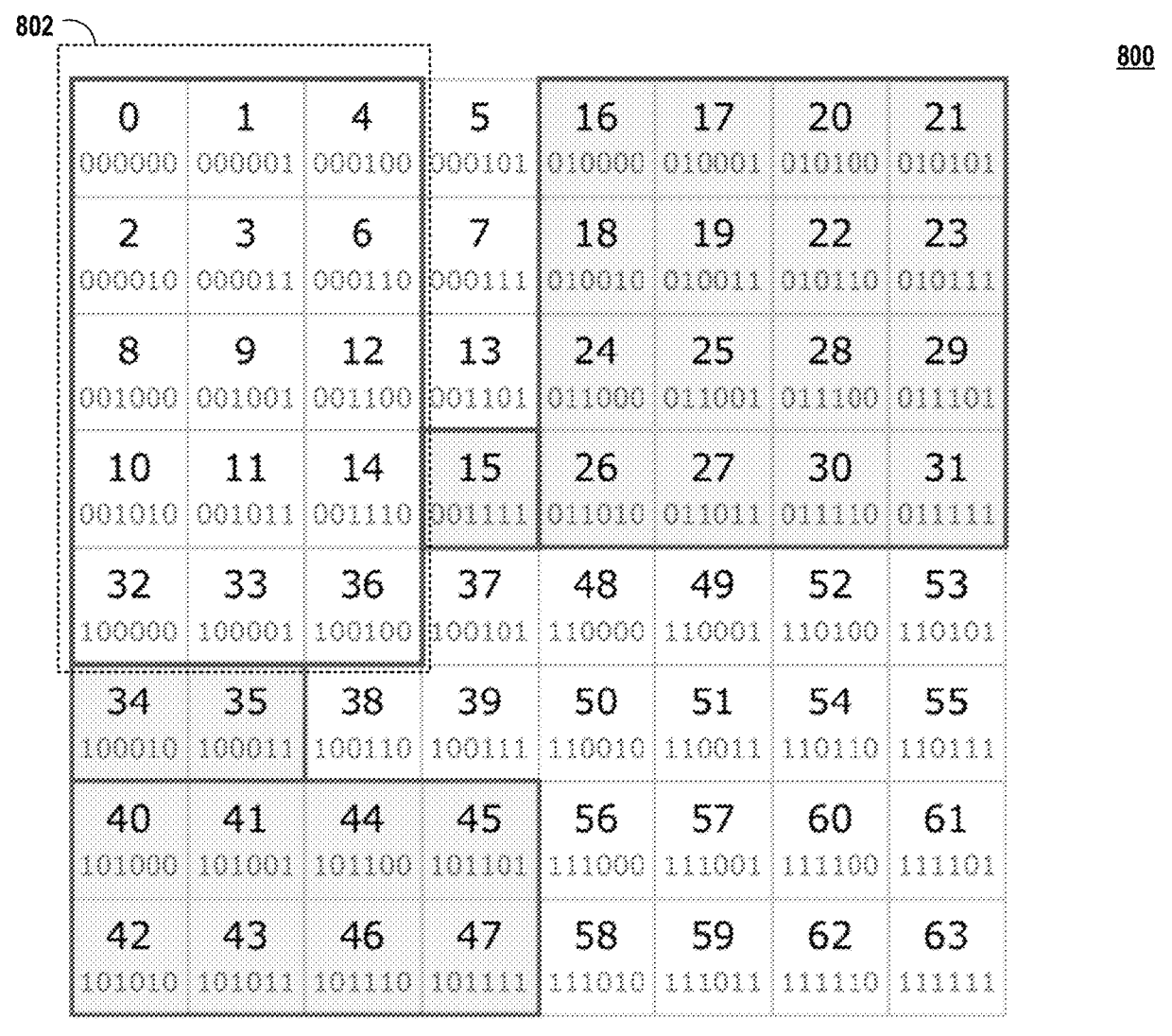

FIG. 8 is an illustration of recursively processing an oblong group of units in accordance with the techniques of this disclosure. As previously noted, non-linear processing may include, in some examples, recursive techniques to compute rasterization. In some examples, recursive techniques may include, but are not limited to, for example, a non-Hilbert algorithm, or another recursive technique. In some examples, a recursive technique may benefit other computation use cases with better locality.

In the example of FIG. 8, the target region 802 to be processed is arranged in a 3 unit by 5 unit rectangle, also referred to as an "oblong." In the example of FIG. 8, GPU 12 processes or rasterizes units having index values 0-4, 6, 8-12, 14, and 32-36 of image 800 and GPU 12 and refrains from processing or rasterizing units having index values 5, 7, 13, 15-31, and 37-63 of image 800. The example of FIG. 8 uses a 3×5 configuration, which may be viewed as a subset of an 8×8 configuration (e.g., a square power of 2 virtual configuration).

In the example of FIG. 8, GPU 12 selects units for processing based on a target shape of the units to be processed in the image. For example, after processing unit 14, fetching unit 37 and/or pixel processing pipeline 38 may increment an initial index value (e.g., 14) corresponding to unit 14 to generate a candidate index value (e.g., 15) corresponding to a candidate unit (e.g., 15). Fetching unit 37 and/or pixel processing pipeline 38 may determine a horizontal position of the candidate unit using odd bits (e.g., 011) of the candidate index value. Fetching unit 37 and/or pixel processing pipeline 38 may determine a vertical position of the candidate unit using even bits (e.g., 011) of the candidate index value.

Fetching unit 37 and/or pixel processing pipeline 38 may determine whether a position of the candidate unit is outside of target region 802 of image 800. For example, to determine whether a position of the candidate unit is outside of target region 802 of image 800, fetching unit 37 and/or pixel processing pipeline 38 may compare the horizontal position (e.g., 4) of the candidate unit (e.g., 15) to a horizontal threshold value (e.g., 3) for target region 802. For instance, fetching unit 37 and/or pixel processing pipeline 38 may determine that position of the candidate unit is outside of target region 802 of the image when the horizontal position of the candidate unit exceeds a horizontal threshold value for target region 802.

In some examples, to determine whether a position of the candidate unit is outside of target region 802 of image 800, fetching unit 37 and/or pixel processing pipeline 38 may compare the vertical position (e.g., 4) of the candidate unit (e.g., 15) to a vertical threshold value (e.g., 5) for target region 802. For instance, fetching unit 37 and/or pixel processing pipeline 38 may determine that a position of the candidate unit is outside of target region 802 of image 800 when the vertical position of the candidate unit exceeds a vertical threshold value for target region 802. In response to determining that the position of the candidate unit is not outside (e.g., inside) target region 802, pixel processing pipeline 38 may process the candidate unit. In response however, to determining that the position of the candidate unit is outside target region 802, pixel processing pipeline 38 may refrain from processing the candidate unit.

In response to determining that the position of the candidate unit is outside target region 802, fetching unit 37 and/or pixel processing pipeline 38 may determine a subsequent index value corresponding to a subsequent unit for the image that is within the target region. For example, fetching unit 37 and/or pixel processing pipeline 38 selects a first odd bit from the right (e.g., least-significant bit) having the value '1' as a selected odd bit. For instance, the index value of 15 (e.g., "001111") has odd bits of "0011̲1̲1̲." In this instance, fetching unit 37 and/or pixel processing pipeline 38 selects the first odd bit as the least significant bit (e.g., "00111̲1̲").

Next, fetching unit 37 and/or pixel processing pipeline 38 selects a first even bit having the value '0' after the first odd bit having the value '1.' Said differently, for example, fetching unit 37 and/or pixel processing pipeline 38 selects a first even bit having the value '0' that is positioned in a more-significant bit than the selected odd bit. For instance, the index value of 15 (e.g., "001111") has even bits of "0̲0̲ 1̲1̲11." In this instance, fetching unit 37 and/or pixel processing pipeline 38 selects the first even bit having the value '0' after the first odd bit having the value '1' as the most significant bit (e.g., "0̲01111"). Fetching unit 37 and/or pixel processing pipeline 38 may change the detected first even bit to '1' and resets all the least significant bits relative to the reset bit. For instance, fetching unit 37 and/or pixel processing pipeline 38 sets the first even bit as '1' and resets the remaining bits (e.g., "100000" or "32"). Pixel processing pipeline 38 may process the subsequent candidate unit. For instance, after processing unit 14, pixel processing pipeline 38 processes unit 32 and refrains from processing unit 15.

The example of FIG. 8 may be implemented using the following algorithm.

If the target region is not square or size of power of 2, computing device 2 may skip indices that go beyond the X range as follows.

index: 5->6
    index: 15->32

Detect first odd bit 1 from right (LSB)
    index 15: 001111
    Index 5: 000101

From this bit on, detect first even bit 0
    index 15: 001111
    index 5: 000101

Change the bit above to 1, reset all LSB bits
    index 15: 100000 (32)
    index 5: 000110 (6)

Y direction is similar

The above algorithm is described in the following. In response to determining that target region 802 is not square or has a size of power of 2, the algorithm may cause GPU 12 to skip indices when the index value corresponds to a unit having a horizontal position that exceeds a horizontal threshold value (e.g., 2) for target region 802. For instance, the algorithm may cause GPU 12 to skip from index value 5 to index value 6. In some instances, the algorithm may cause GPU 12 to skip from index value 15 to index value 32.

More specifically, the algorithm may cause GPU 12 to detect a least-significant bit (LSB) odd bit having a value of '1'. For example, for the index value 15 (e.g., 01111), the algorithm may cause GPU 12 to detect the first bit (e.g., 00111̲1̲). In some examples, for the index value 5 (e.g., 000101), the algorithm may cause GPU 12 to detect the first bit (e.g., 00010̲1̲).

The algorithm may cause GPU 12 to detect, from the detected LSB odd bit having a value of '1', a LSB even bit having a value of '0'. For example, for the index value 15 (e.g., 01111), the algorithm may cause GPU 12 to detect the fifth bit (e.g., 0̲01111). In some examples, for the index value 5 (e.g., 000101), the algorithm may cause GPU 12 to detect the second bit (e.g., 0001̲0̲1).

The algorithm may cause GPU 12 to change the detected LSB odd bit having a value of '1' to 1 and reset all LSB bits from the detected LSB odd bit having a value of '1'. For example, the algorithm may cause GPU 12 to change the index value from 15 (e.g., 001111) to 32 (e.g., 010000). For example, the algorithm may cause GPU 12 to change the index value from 5 (e.g., 000101) to 6 (e.g., 000110). The algorithm may cause GPU 12 to perform a similar process in the Y direction.

The example of FIG. 8 may be implemented using the following pseudo-code.

```
If not power of 2 size or square, get the next power of 2 square-size
Size_power_2,
WG_index = 0;
While WG_index<size_power_2
{
    X = odd bits of WG_index;      Y = even bits of WG_index;
    If X > ND_range_X
    {
    Detect first odd bit 1 from right (LSB;
    From this bit on, detect first event bit 0;
    Change the bit above to 1, clear all LSB bits to form WG_index;
    Y = even bits of WG_index;
    if Y> ND_range_Y       done and exit;
    else                   X = odd bits of WG_index
    }
    elseif Y > ND_range_Y
    {
    Detect first even bit 1 from right (LSB;
    From this bit on, detect first odd bit 0;
    Change the bit above to 1, clear all LSB bits to form WG_index;
    if X > ND_range_X       done and exit;
    else                    Y = even bits of WG_index;
    }
    WG_X_Coord = X*WG_size_X;
    WG_Y_Coord = Y*WG_size_Y;
    WG_index = WG_index + 1;
}
```

In the above pseudo-code, WG_index corresponds to an index value for a working group or unit to be processed, size_power_2 represents a largest square of index values that is within a target region, ND_range_X represents a horizontal, threshold value for the target region, ND_range_Y represents a vertical threshold value for the target region, WG_X_Coord represents a horizontal position of a next working group or unit to be processed, and WG_Y_Coord represents a vertical position of a next working group or unit to be processed.

Figure 9:
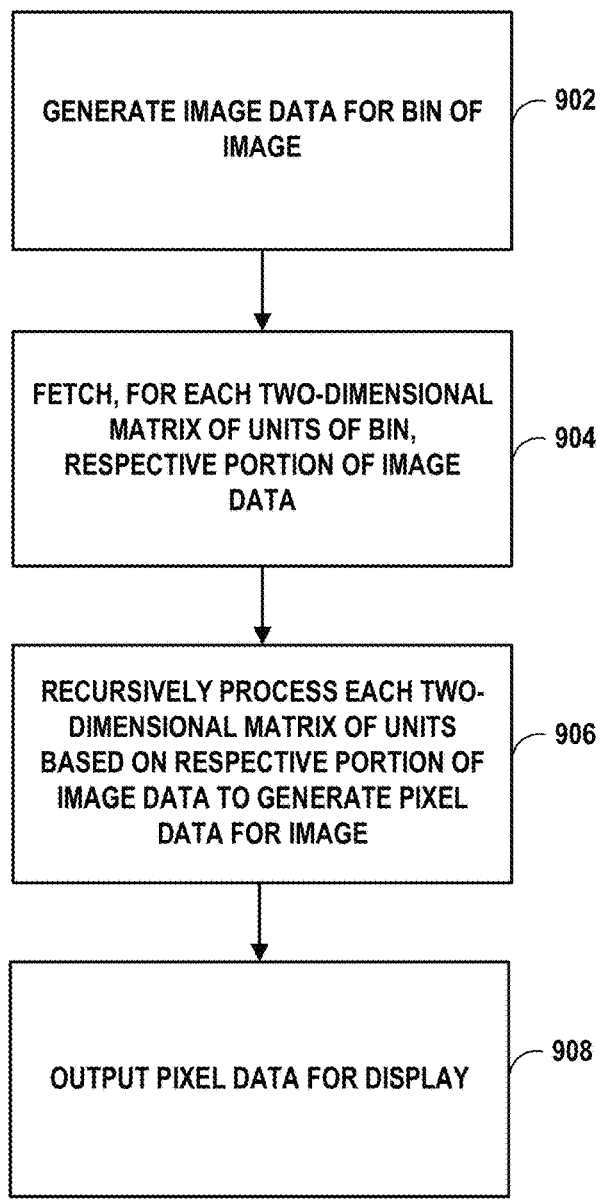
FIG. 9 is a flowchart illustrating a method of non-linear processing of two-dimensional data in accordance with the techniques of this disclosure.

FIG. 9 is a flowchart illustrating a method of non-linear processing of two-dimensional data in accordance with the techniques of this disclosure. FIG. 9 is a flowchart illustrating a method according to one example of the disclosure. The method of FIG. 9 may be performed by GPU 12, CPU 6, display interface 16, and/or any other hardware, firmware, software element, or combination thereof, residing on computing device 2.

GPU 12 may generate image data for an image (902). For example, rasterization stage 36 may generate image data (e.g., source pixels). GPU 12 may fetch, for each two-dimensional matrix of units of an image, a respective portion of the image data (904). For example, fetching unit 37 may retrieve, for each two-dimensional matrix of units of an image, a respective portion of the image data from system memory 10 and store the respective portion in graphics memory 14.

GPU 12 may recursively process each two-dimensional matrix of units based on a respective portion of the image data to generate pixel data (e.g., destination pixel data) for the image (906). For example, pixel processing pipeline 38 may recursively process each two-dimensional matrix of units based on a respective portion of the image. For instance, pixel processing pipeline 38 may process units arranged in a first two-dimensional matrix of an image, where the first two-dimensional matrix includes multiple units arranged in a first row of the image and multiple units arranged in a second row of the image that is adjacent to the first row of the image. In this instance, pixel processing pipeline 38 may process, after processing the units arranged in the first two-dimensional matrix, units arranged in a second two-dimensional matrix of the image, where the second two-dimensional matrix includes one or more units arranged in the first row of the image and one or more units arranged in the second row of the image.

GPU 12 may output the pixel data for display (908). For example, pixel processing pipeline 38 may output the pixel data (e.g., destination pixel data) for storage at frame buffer 15. In this example, display interface 16 may retrieve the pixel data from frame buffer 15 and output the pixel data to display 18.

Figure 10:
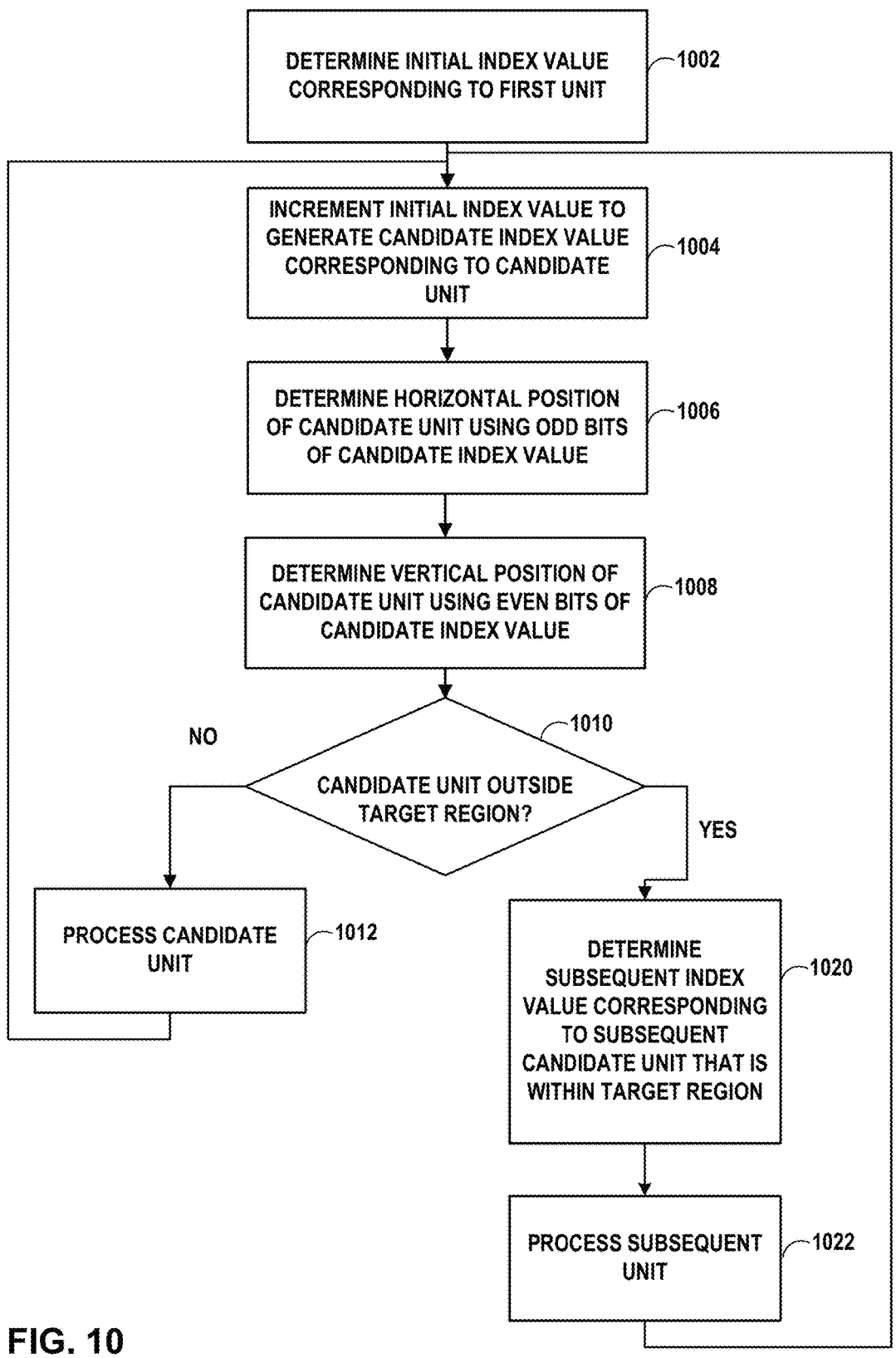
FIG. 10 is a flowchart illustrating a method of determining a position of a candidate unit for processing in accordance with the techniques of this disclosure.

FIG. 10 is a flowchart illustrating a method of determining a position of a candidate unit for processing in accordance with the techniques of this disclosure. FIG. 10 is a flowchart illustrating a method according to one example of the disclosure. The method of FIG. 10 may be performed by GPU 12, CPU 6, display interface 16, and/or any other hardware, firmware, software element, or combination thereof, residing on computing device 2.

GPU 12 determines an initial index value corresponding to a first unit (1002). GPU 12 increments the initial index value to generate a candidate index value corresponding to the candidate unit (1004). GPU 12 determines a horizontal position of the candidate unit using odd bits of the candidate index value (1006). GPU 12 determines a vertical position of the candidate unit using even bits of the candidate index value (1008). GPU 12 determines whether the candidate unit is outside of a target region (1010). In response to determining that the candidate unit is not outside (e.g., inside) of the target region ("NO" of 1010), GPU 12 process the candidate unit (1012) and the process restarts to 1004.

In response, however, to determining that the candidate unit is outside of the target region ("YES" of 1010), GPU 12 determines a subsequent index value corresponding to a subsequent candidate unit that is within the target region (1020). GPU processes the subsequent unit (1022) and the process restarts to 1004.

Figure 11:
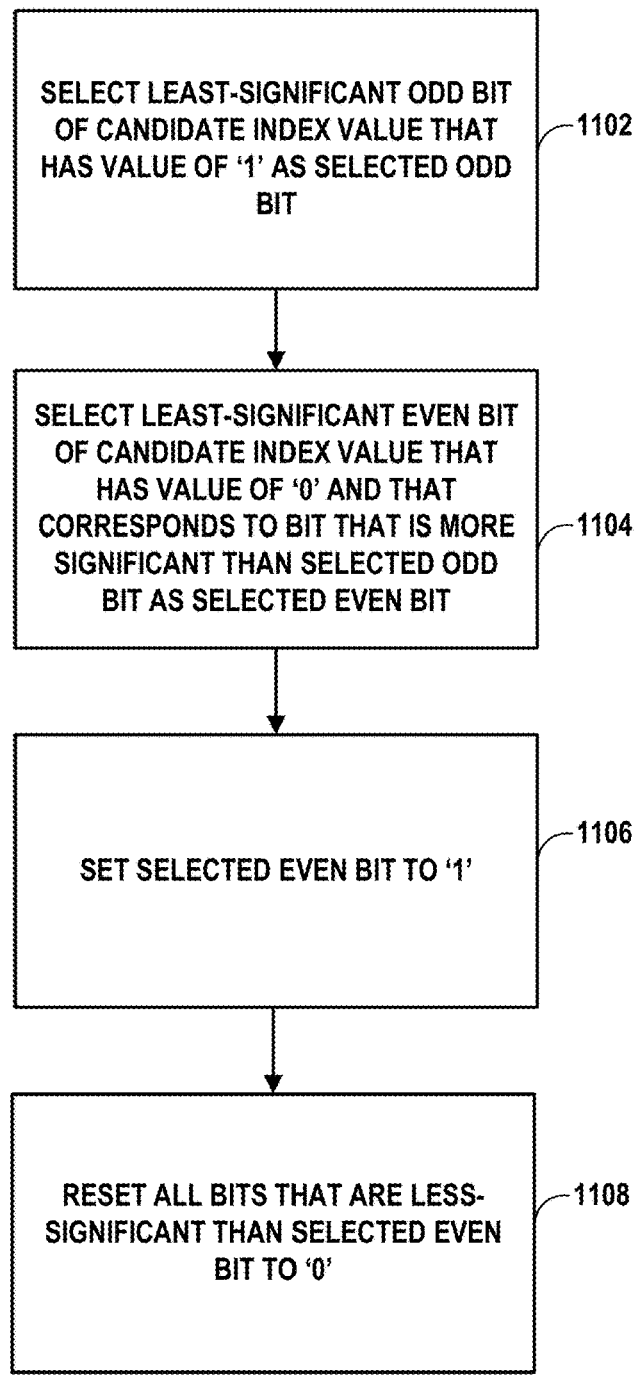
FIG. 11 is a flowchart illustrating a method of determining a subsequent index value based on a target region of an image in accordance with the techniques of this disclosure.

FIG. 11 is a flowchart illustrating a method of determining a subsequent index value based on a target region of an image in accordance with the techniques of this disclosure. FIG. 11 is a flowchart illustrating a method according to one example of the disclosure. The method of FIG. 11 may be performed by GPU 12, CPU 6, display interface 16, and/or any other hardware, firmware, software element, or combination thereof, residing on computing device 2.

GPU 12 selects a least-significant odd bit of a candidate index value that has a value of '1' as a selected odd bit (1102). GPU 12 selects a least-significant even bit of the candidate index value that has a value of '0' and that corresponds to a bit that is more significant than the selected odd bit as selected even bit (1104). GPU 12 sets the selected even bit to '1' (1106). GPU 12 resets all the bits that are less-significant than the selected even bit to '0' (1108).

In one or more examples, the functions described above may be implemented in hardware, software, firmware, or any combination thereof. If implemented in software, the functions may be stored as one or more instructions or code on an article of manufacture including a non-transitory computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media may include RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more DSPs, general purpose microprocessors, ASICs, FPGAs, or other equivalent integrated or discrete logic circuitry. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for non-linear graphics processing comprising:
generating, by a processor, image data for an image;
fetching, by the processor, for each two-dimensional matrix of a plurality of two-dimensional matrices of units of the image, a respective portion of the image data, wherein fetching, for each two-dimensional matrix of the plurality of two-dimensional matrices of units, the respective portion of the image data comprises:
fetching a first portion of the image data for processing units of a first two-dimensional matrix of the plurality of two-dimensional matrices; and
fetching, after fetching the first portion of the image data, a second portion of the image data for processing units of a second two-dimensional matrix of the plurality of two-dimensional matrices; and
processing, by the processor, each two-dimensional matrix of the plurality of two-dimensional matrices based on the respective portion of the image data to generate pixel data for the image, wherein processing each two-dimensional matrix of the plurality of two-dimensional matrices comprises:
processing a plurality of units arranged in the first two-dimensional matrix based on the first portion of the image data,
wherein the first two-dimensional matrix includes a plurality of units arranged in a first row of the image and a plurality of units arranged in a second row of the image that is adjacent to the first row of the image; and
processing, after processing the plurality of units arranged in the first two-dimensional matrix, a plurality of units arranged in the second two-dimensional matrix based on the second portion of the image data, wherein the second two-dimensional matrix includes one or more units arranged in the first row of the image and one or more units arranged in the second row of the image, wherein processing the plurality of units arranged in the second two-dimensional matrix comprises processing one or more units arranged in the second two-dimensional matrix using the first portion of image data for processing units of the first two-dimensional matrix.

2. The method of claim 1, wherein processing each two-dimensional matrix of the plurality of two-dimensional matrices comprises:
recursively processing the image using the plurality of two-dimensional matrices.

3. The method of claim 2, wherein recursively processing the image comprises:
processing a subset of the plurality of two-dimensional matrices,
wherein each two-dimensional matrix of the subset of the plurality of two-dimensional matrices forms a square of units of the image, and
wherein a subset of the subset of two-dimensional matrices forms a square of units of the image.

4. The method of claim 1, further comprising:
incrementing, by the processor, an initial index value corresponding to a first unit of the image to generate a candidate index value corresponding to a candidate unit of the image;
determining, by the processor, a horizontal position of the candidate unit using odd bits of the candidate index value; and
determining, by the processor, a vertical position of the candidate unit using even bits of the candidate index value, wherein processing each two-dimensional matrix of the plurality of two-dimensional matrices is based on the horizontal position of the candidate unit and the vertical position of the candidate unit.

5. The method of claim 4, further comprising:
determining, by the processor, that a position of the candidate unit is inside a target region of the image, wherein processing each two-dimensional matrix of the plurality of two-dimensional matrices comprises processing the candidate unit in response to determining that the position of the candidate unit is inside the target region.

6. The method of claim 5, wherein determining that the position of the candidate unit is inside the target region of the image comprises:
comparing, by the processor, the horizontal position of the candidate unit to a horizontal threshold value for the target region; and
comparing, by the processor, the vertical position of the candidate unit to a vertical threshold value for the target region.

7. The method of claim 4, further comprising:
in response to determining that a position of the candidate unit is outside a target region of the image, determining, by the processor, a subsequent index value corresponding to a subsequent candidate unit for the image that is within the target region, wherein processing each two-dimensional matrix of the plurality of two-dimensional matrices comprises:
in response to determining that the position of the candidate unit is outside the target region:
refraining from processing the candidate unit; and
processing the subsequent candidate unit.

8. The method of claim 7, wherein determining the subsequent index value comprises:
selecting a least-significant odd bit of the candidate index value that has a value of '1' as a selected odd bit of the candidate index value;
selecting a least-significant even bit of the candidate index value that has a value of '0' and that is positioned in a more-significant bit than the selected odd bit as a selected even bit of the candidate index value;
setting the selected even bit to '1'; and
resetting all bits that are less-significant than the selected even bit to '0'.

9. The method of claim 1, wherein the processor is a graphics processing unit and wherein fetching, for each two-dimensional matrix of the plurality of two-dimensional matrices of units, the respective portion of the image data comprises fetching, from system memory, for storage at graphics memory for the graphics processing unit, the respective portion of the image data.

10. The method of claim 1, wherein fetching, for each two-dimensional matrix of the plurality of two-dimensional matrices of units, the respective portion of the image data comprises fetching image data for a neighboring unit to process a particular unit of a respective two-dimensional matrix of units, the neighboring unit being arranged above or below the particular unit and outside of the respective two-dimensional matrix.

11. The method of claim 1, wherein processing each two-dimensional matrix of the plurality of two-dimensional matrices comprises one or more of motion blur processing, depth of field processing, or Gaussian blur processing.

12. The method of claim 1, wherein fetching, for each two-dimensional matrix of the plurality of two-dimensional matrices of units, the respective portion of the image data comprises:
determining, by the processor, for each unit of each two-dimensional matrix of the plurality of two-dimensional matrices, two-dimensional image data for processing a respective unit, wherein processing each two-dimensional matrix of the plurality of two-dimensional matrices comprises:
processing each unit of the image using the respective two-dimensional image data.

13. The method of claim 12, wherein the two-dimensional image data comprises one or more of: red, green, blue (RGB) data; red, green, blue, alpha (RGBA) data; chroma data; luma data; or alpha data.

14. The method of claim 1, further comprising:
determining, by the processor, for each two-dimensional matrix of the plurality of two-dimensional matrices of units, a size of the respective portion of the image data based on one or more of a cache size of the processor or an image format for the image.

15. A device for non-linear graphics processing comprising:
a memory; and
at least one processor configured to:
  generate image data for an image;
  fetch, for each two-dimensional matrix of a plurality of two-dimensional matrices of units of the image, for storage at the memory, a respective portion of the image data, wherein, to fetch, for each two-dimensional matrix of the plurality of two-dimensional matrices of units, the respective portion of the image data, the at least one processor is configured to:
    fetch a first portion of the image data for processing units of a first two-dimensional matrix of the plurality of two-dimensional matrices; and
    fetch, after fetching the first portion of image data, a second portion of the image data for processing units of a second two-dimensional matrix of the plurality of two-dimensional matrices; and
  process each two-dimensional matrix of the plurality of two-dimensional matrices based on the respective portion of the image data to generate pixel data for the image, wherein, to process each two-dimensional matrix of the plurality of two-dimensional matrices, the at least one processor is configured to:
    process a plurality of units arranged in the first two-dimensional matrix based on the first portion of the image data, wherein the first two-dimensional matrix includes a plurality of units arranged in a first row of the image and a plurality of units arranged in a second row of the image that is adjacent to the first row of the image; and
    process, after processing the plurality of units arranged in the first two-dimensional matrix, a plurality of units arranged in the second two-dimensional matrix based on the second portion of the image data, wherein the second two-dimensional matrix includes one or more units arranged in the first row of the image and one or more units arranged in the second row of the image, wherein, to process the plurality of units arranged in the second two-dimensional matrix, the at least one processor is configured to process one or more units arranged in the second two-dimensional matrix using the first portion of image data for processing units of the first two-dimensional matrix.

16. The device of claim 15, wherein, to process each two-dimensional matrix of the plurality of two-dimensional matrices, the at least one processor is configured to:
recursively process the image using the plurality of two-dimensional matrices.

17. The device of claim 16, wherein, to recursively process the image, the at least one processor is configured to:
process a subset of the plurality of two-dimensional matrices,
wherein each two-dimensional matrix of the subset of the plurality of two-dimensional matrices forms a square of units of the image, and
wherein a subset of the subset of two-dimensional matrices forms a square of units of the image.

18. The device of claim 15, wherein the at least one processor is configured to:
increment an initial index value corresponding to a first unit of the image to generate a candidate index value corresponding to a candidate unit of the image;
determine a horizontal position of the candidate unit using odd bits of the candidate index value; and
determine a vertical position of the candidate unit using even bits of the candidate index value, wherein, to process each two-dimensional matrix of the plurality of two-dimensional matrices, the at least one processor is configured to process each two-dimensional matrix of the plurality of two-dimensional matrices based on the horizontal position of the candidate unit and the vertical position of the candidate unit.

19. The device of claim 18, wherein the at least one processor is configured to:
determine that a position of the candidate unit is inside a target region of the image, wherein, to process each two-dimensional matrix of the plurality of two-dimensional matrices, the at least one processor is configured to process the candidate unit in response to determining that the position of the candidate unit is inside the target region.

20. The device of claim 19, wherein, to determine that the position of the candidate unit is inside the target region of the image, the at least one processor is configured to:
compare the horizontal position of the candidate unit to a horizontal threshold value for the target region; and
compare the vertical position of the candidate unit to a vertical threshold value for the target region.

21. The device of claim 18, wherein the at least one processor is configured to:
in response to determining that a position of the candidate unit is outside a target region of the image, determine a subsequent index value corresponding to a subsequent unit for the image that is within the target region, wherein, to process each two-dimensional matrix of the plurality of two-dimensional matrices, the at least one processor is configured to:
in response to determining that the position of the candidate unit is outside the target region:
refrain from processing the candidate unit; and
process the subsequent candidate unit.

22. The device of claim 21, wherein, to determine the subsequent index value, the at least one processor is configured to:
select a least-significant odd bit of the candidate index value that has a value of '1' as a selected odd bit of the candidate index value;
select a least-significant even bit of the candidate index value that has a value of '0' and that is positioned in a more-significant bit than the selected odd bit as a selected even bit of the candidate index value;
set the selected even bit to '1'; and
reset all bits that are less-significant than the selected even bit to '0'.

23. The device of claim 15, wherein the device comprises one or more of a camera, a computer, a mobile device, a broadcast receiver device, or a set-top box.

24. The device of claim 15, wherein the device comprises at least one of:
   an integrated circuit;
   a microprocessor; or
   a wireless communication device.

25. A non-transitory computer-readable storage medium storing instructions that, when executed, cause at least one processor to:
   generate image data for an image;
   fetch, for each two-dimensional matrix of a plurality of two-dimensional matrices of units of the image, a respective portion of the image data, wherein, to fetch, for each two-dimensional matrix of the plurality of two-dimensional matrices of units, the respective portion of the image data, the instructions further cause the at least one processor to:
      fetch a first portion of the image data for processing units of a first two-dimensional matrix of the plurality of two-dimensional matrices; and
      fetch, after fetching the first portion of image data, a second portion of the image data for processing units of a second two-dimensional matrix of the plurality of two-dimensional matrices; and
   process each two-dimensional matrix of the plurality of two-dimensional matrices based on the respective portion of the image data to generate pixel data for the image, wherein, to process each two-dimensional matrix of the plurality of two-dimensional matrices, the instructions further cause the at least one processor to:
      process a plurality of units arranged in the first two-dimensional matrix based on the first portion of the image data, wherein the first two-dimensional matrix includes a plurality of units arranged in a first row of the image and a plurality of units arranged in a second row of the image that is adjacent to the first row of the image; and
      process, after processing the plurality of units arranged in the first two-dimensional matrix, a plurality of units arranged in the second two-dimensional matrix based on the second portion of the image data, wherein the second two-dimensional matrix includes one or more units arranged in the first row of the image and one or more units arranged in the second row of the image, wherein, to process the plurality of units arranged in the second two-dimensional matrix, the instructions further cause the at least one processor to process one or more units arranged in the second two-dimensional matrix using the first portion of image data for processing units of the first two-dimensional matrix.

* * * * *